(12) United States Patent
Caldwell

(10) Patent No.: US 10,869,539 B2
(45) Date of Patent: Dec. 22, 2020

(54) HOLSTER WITH ADJUSTABLE POCKET

(71) Applicant: Gordon M Caldwell, Milton, WA (US)

(72) Inventor: Gordon M Caldwell, Milton, WA (US)

(*) Notice: Subject to any disclaimer, the term of this patent is extended or adjusted under 35 U.S.C. 154(b) by 0 days.

(21) Appl. No.: 15/669,945

(22) Filed: Aug. 6, 2017

(65) Prior Publication Data
US 2018/0235351 A1  Aug. 23, 2018

Related U.S. Application Data

(63) Continuation-in-part of application No. 29/594,554, filed on Feb. 20, 2017, now Pat. No. Des. 825,916.

(60) Provisional application No. 62/461,713, filed on Feb. 21, 2017.

(51) Int. Cl.
| | |
|---|---|
| *A45F 3/00* | (2006.01) |
| *A45F 3/14* | (2006.01) |
| *H04B 1/3827* | (2015.01) |
| *H04B 1/3888* | (2015.01) |

(52) U.S. Cl.
CPC ............... *A45F 3/14* (2013.01); *H04B 1/385* (2013.01); *A45F 2003/003* (2013.01); *A45F 2003/142* (2013.01); *A45F 2003/144* (2013.01); *A45F 2003/146* (2013.01); *A45F 2003/148* (2013.01); *A45F 2200/0508* (2013.01); *A45F 2200/0516* (2013.01); *A45F 2200/0525* (2013.01); *A45F 2200/0575* (2013.01); *H04B 1/3888* (2013.01); *H04B 2001/3855* (2013.01)

(58) Field of Classification Search
CPC ................. A45F 3/14; A45F 2003/003; A45F 2003/144; A45F 2003/142; A45F 2003/146; A45F 2200/0575; A45F 2200/0525; A45F 2200/0508; H04B 1/23888
See application file for complete search history.

(56) References Cited

U.S. PATENT DOCUMENTS

| | | | |
|---|---|---|---|
| 3,884,403 A | | 5/1975 | Brewer |
| 4,046,295 A | * | 9/1977 | Eichler ..................... A45F 5/02 |
| | | | 224/242 |
| 4,420,104 A | * | 12/1983 | Dilenno .................. A45F 5/021 |
| | | | 224/250 |
| 4,923,105 A | * | 5/1990 | Snyder ...................... A45F 3/14 |
| | | | 224/232 |

(Continued)

*Primary Examiner* — Peter N Helvey
*Assistant Examiner* — Lester L Vanterpool
(74) *Attorney, Agent, or Firm* — Kal K Lambert; Lambert Patent Services, LLC

(57) ABSTRACT

A holster with an adjustable-depth "pocket" for hands-free use and carrying of electronic devices. The pocket is "sleeve like" and is defined by four walls, a stirrup webbing on the bottom, and an elastic restraining cord on top, thus forming a six-element restraining system for dampening device movement. The tongue forms a "stirrup" pendent from the front wall that is looped below the pocket and brought up inside the pocket, where it reversibly and adjustable attaches inside the back wall. The elastic cord is fastened superiorly on the back wall and is secured to the front wall near the top lip with a snap or clasp so that the device is immobilized while permitting access to device controls. The upper lips of the side walls are angulated so as to form a "guide slot" or "rails" for self-centering and guiding the device into the stirrup. The holster may be integrated into complex wearable combinations that are comfortable, durable and multifunctional.

18 Claims, 23 Drawing Sheets

(56) References Cited

U.S. PATENT DOCUMENTS

| | | | |
|---|---|---|---|
| 4,986,459 A | 1/1991 | Yarbrough | |
| 5,450,993 A * | 9/1995 | Guerrero | H04B 1/3888 224/246 |
| D364,270 S | 11/1995 | Kellermann | |
| D370,776 S | 6/1996 | Frey | |
| D371,457 S * | 7/1996 | Jacobs | 224/609 |
| D384,200 S | 9/1997 | Caldwell | |
| 5,957,357 A * | 9/1999 | Kallman | A45F 5/02 224/242 |
| 6,000,592 A * | 12/1999 | Clanin | B62J 11/00 224/413 |
| 6,179,185 B1 | 1/2001 | Dancyger | |
| 6,182,878 B1 * | 2/2001 | Racca | A45C 15/00 224/236 |
| 6,330,430 B1 * | 12/2001 | Jensfelt | H04B 1/3888 455/575.8 |
| 6,364,187 B1 * | 4/2002 | Castellano | A45F 5/02 224/236 |
| 6,412,674 B1 * | 7/2002 | Lipke | A45C 7/00 224/235 |
| 6,446,852 B1 | 9/2002 | Sorensen | |
| 6,718,558 B1 * | 4/2004 | Callanta | A41F 9/002 2/312 |
| 7,270,255 B2 * | 9/2007 | Badillo | A45C 9/00 224/191 |
| 7,597,225 B2 * | 10/2009 | Badillo | A45C 9/00 224/191 |
| 8,573,458 B1 * | 11/2013 | Hamilton | A45F 5/021 224/250 |
| 9,232,850 B2 | 1/2016 | Moreau | |
| 9,392,863 B2 * | 7/2016 | Hamilton | A45F 5/021 |
| 9,693,623 B2 * | 7/2017 | Bryant | A45F 5/021 |
| 9,808,074 B2 * | 11/2017 | Kinskey | A45F 5/021 |
| 10,568,409 B2 * | 2/2020 | Carpenter | A45F 5/02 |
| D876,827 S * | 3/2020 | Hamilton | D3/218 |
| 2003/0213827 A1 | 11/2003 | Langmuir | |
| 2005/0284909 A1 * | 12/2005 | Munoz | A45C 1/04 224/674 |
| 2006/0086769 A1 | 4/2006 | Godshaw | |
| 2007/0278270 A1 | 12/2007 | Castaneda | |
| 2008/0006668 A1 * | 1/2008 | Nowacki | A45F 3/02 224/625 |
| 2011/0314592 A1 | 12/2011 | Wells-Chubb | |
| 2012/0181318 A1 * | 7/2012 | Mongan | A45F 5/021 224/665 |
| 2013/0119098 A1 * | 5/2013 | Stiefel | A45F 5/02 224/183 |
| 2015/0021372 A1 * | 1/2015 | Moreau | A45F 5/02 224/677 |
| 2015/0237999 A1 * | 8/2015 | Kinskey | A45F 5/021 224/660 |

\* cited by examiner

CONSTRUCTION DETAIL

SECTION VIEWS STIRRUP

FRONT VIEW

ELASTIC SPAGHETTI CORD

SNAP CLIP

TOP VIEW

CONTACT FASTENER INTERFACE

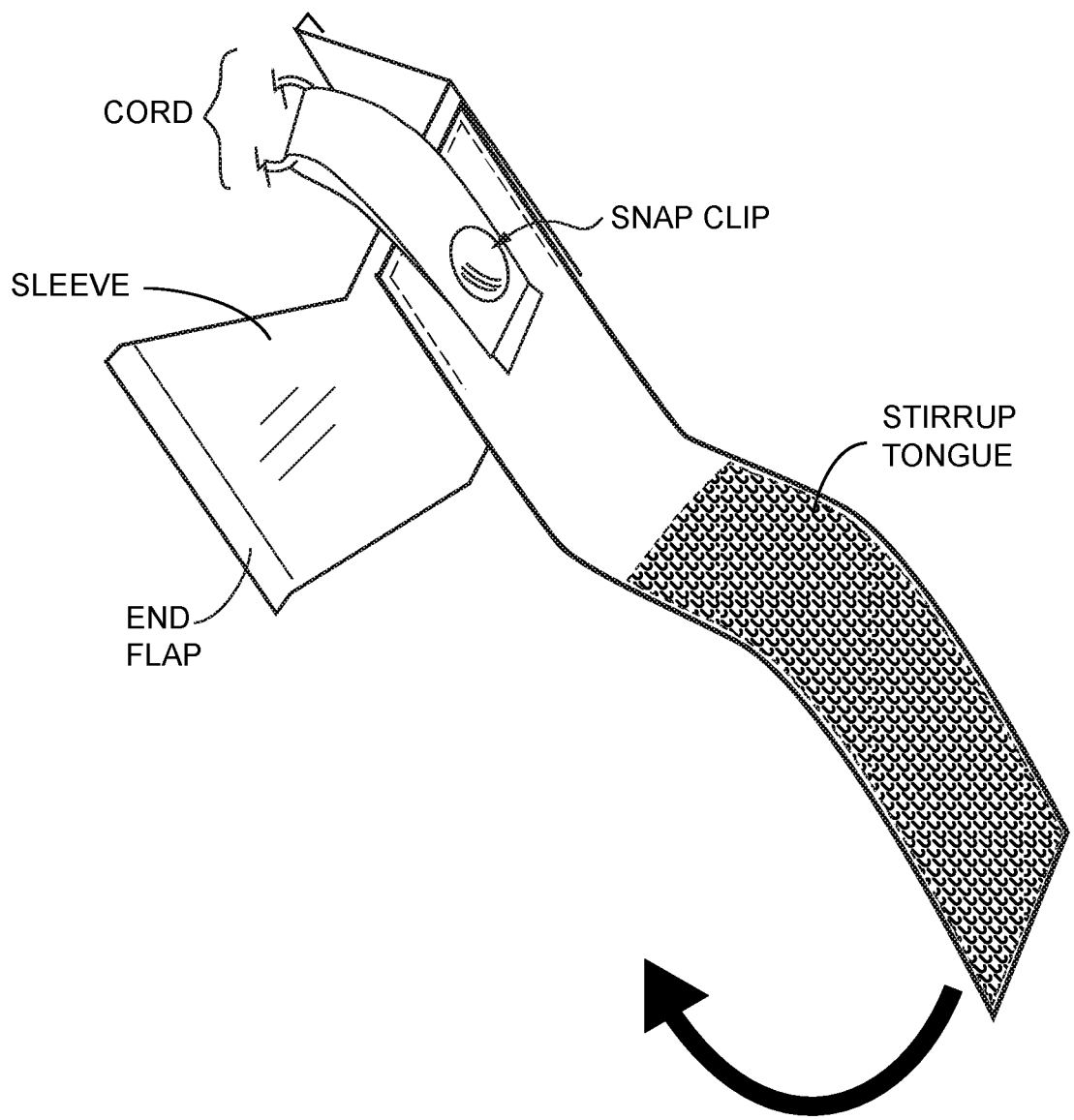

MULTIPURPOSE BELLOW POUCH

MODULE 1

HARNESS WITH RADIO HOLSTER

HOLSTER WITH ADJUSTABLE POCKET

CROSS REFERENCE TO RELATED APPLICATIONS

This application is a Continuation-in-Part (and claims the benefit of priority under 37 CFR § 120) from U.S. patent application Ser. No. 29/594,554, filed 20 Feb. 2017, now U.S. Design Pat. No. D825916. This application further claims the benefit of priority under 35 U.S.C. § 119(e) from U.S. Provisional Patent Appl. No. 62/461,713 filed 21 Feb. 2017. This application is related to U.S. Design Pat. No. D384200. All of said US patents and patent documents are commonly owned and hereby incorporated by reference in their entirety.

GOVERNMENT SUPPORT

Not Applicable.

TECHNICAL FIELD

This disclosure pertains generally to the field of carrying cases for carrying boxy handheld electronic devices, specifically a mountable pocket with stirrup web providing adjustability of depth for accommodation devices of varying height and angulated lateral pocket walls for guiding the device into the stirrup.

COPYRIGHT NOTICE

A portion of the disclosures of this patent document contains or may contain material that is subject to copyright protection and design patent protection. The copyright and design owner has no objection to the photocopy or electronic reproduction by anyone of the patent document or the patent disclosure in exactly the form it appears in the United States Patent and Trademark Office patent file or electronic records, but otherwise reserves all copyright rights whatsoever.

BACKGROUND

In business across a multitude of industries, there is an increasing need for more versatility and cost reduction associated with providing holsters intended for carrying handheld electronic devices such as two-way radios, cellphones, satellite phones, notebooks, multimeters, smart readers for doing inventory, and so forth. The market is currently filled by the device manufacturers, such that a holster is supplied that fits only the particular device made by the manufacturer and is branded accordingly.

However, these holsters do not flexibly meet most of the needs of the end user. Holsters of the prior art may be utilized on a belt or as a clip-on but are not designed or intended to be integrated into an existing product, such as a shoulder holster or chest harness as needed for use in a hands-free work environment, a pouch that also carries other tools, and may not be compatible with an oversized battery, for example. Instead, in conventional art, each device requires a specific holster. Any modifications to provide versatility and reductions in redundant costs are essentially impossible with equipment supplied by the device manufacturer (OEM). Many buyers attempt to reduce cost impacts of the OEM-supplied holsters by using improperly or poorly fitted holsters. This leads to dropped or lost devices and often inaccessibility of essential buttons or plugins. Reduction of user productivity and/or safety is unavoidable.

In the last decade, the widespread adoption of cellphones seemed to offer a universal communication mode and resulted in a decline in the popularity of two-way radios. But there is now a renewed interest in radio-band communications. Cellphones cannot be handled roughly, have limited power, and cell networks are easily saturated. As made clear by disasters such as 9/11 in New York and Hurricane Katrina in New Orleans, the public and private sectors have now recognized that WAN radio transceivers (broadly "smart devices") are dependable at times when cellphone calls cannot be completed.

Two-way radios are an effective way to achieve reliable communications for many industries including, but not limited to: emergency personnel, federal details, military branches, city municipalities, shipping companies, oil refineries, security details, amusement parks, maintenance departments, engineers, railroad crews, linemen, bus drivers, film productions, sound management, landscaping, construction and more. Additionally, two-way radios are more practical in recreational activities that require the constant use of one's hands, such as rock-climbing and biking. But there are still some pitfalls that need to be addressed to optimize the advantages of radio transceivers over cellphones in these kinds of applications. Each trade may require a somewhat different set of tools and hence a different harness ensemble. A holster is needed that can be inexpensively integrated into various harnesses, packs, pouches, and so forth, that can carry combinations of tools and that move comfortably with the body while remaining accessible. When holstered, there may be insufficient open access to essential buttons and ports. The need to remove the device from the holster in order to use it defeats the holster's purpose, and increases the risk of losing and/or damaging the device. Given this background, there is a need for a holster that is easily integrated into larger harness ensembles, and accommodates and secures devices of various sizes and shapes so that changing out or upgrading a particular radio or other electronic device no longer requires buying a new holster and/or harness. Needed is a better holster so that end users can make the best use of their electronic devices.

SUMMARY

In a first embodiment, the invention is a "holster" with an adjustable-depth "pocket" and a system for securing an electronics device on six-sides, while allowing open access to user controls. The holster may be used as a one-piece belt-mounted holster for electronics, or in combination with other features. Advantageously, the holder also facilitates integration into larger ensembles such as tool harnesses, backpacks, tool belts, fanny packs, tool pouches, soft multi-compartment cases, and so forth. For instance, the holster may be combined with a shoulder harness that is worn by an end user, whereby the pocket is utilized for carrying and for hands-free communication by two-way radio; while at the same time the user comfortably performs complex activities.

More generally, the pocket compartment is assembled from flexible sheets formed into back, front and lateral walls, and a bottom webbing disposed as an adjustable "stirrup" so as to flexibly accommodate various sized devices. The stirrup webbing begins near the top lip of the outside face of the front pocket wall and has an inelastic "tongue" of a length sufficient to be looped under the pocket and brought back up into the pocket, where it attaches inside the rear wall, preferably by a hook-and-loop contact fastener. By adjusting the length of the stirrup, a tough and close-fitting pocket with adjustable pocket depth is provided.

To prevent the item from slipping out of the pocket, an elastic "spaghetti" loop or cord is fastened superiorly to the inside of the back wall and is secured to the outside of the front wall near the top lip with a snap or clasp. The adjustable stirrup and elastic loop completely encircle the item from above and below, preventing it from shaking loose, and in combination with the back, front and side walls, secures the item on six sides.

By pre-assembling the pocket on a backing layer, a stiffer holster assembly is formed with a double-walled back side. The holster assembly on its backing layer may be used to manufacture complex, multifunctional harness, pack or pouch ensembles that are quickly produced. Advantageously, the backing layer conceals any stitching ends on the backside of the pocket and by adding trim to the edges, results in an attractive but durable holster as part of a larger ensemble. By using soft materials, the holster and integrated assemblies are more pliant and comfortable to wear.

Versatility and cost reduction is achieved. The holster accomplishes these sometimes conflicting goals through core principles of adjustable depth of pocket, device self-alignment (with decreased resistance of the device during insertion and removal), device stabilization on six sides, and ease of access to various functions of the device (such as push-to-talk buttons and plug in accessories).

This invention meets the need for a versatile and highly customizable holster. It answers the evolving needs of businesses and consumers across a multitude of industries, that demand more versatility and costs reductions associated with having one holster for various sized two-way radios currently in use or new electronic device purchases.

These and other elements, features, steps, and advantages of the invention will be more readily understood upon consideration of the following detailed description of the invention, taken in conjunction with the accompanying drawings, in which presently preferred embodiments of the invention are illustrated by way of example, and in the claims.

The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the inventive art disclosed here are more readily understood by considering the drawings in conjunction with the written description including the claims, in which:

FIG. 14 is a completed outside sleeve subassembly.

Figure 1:
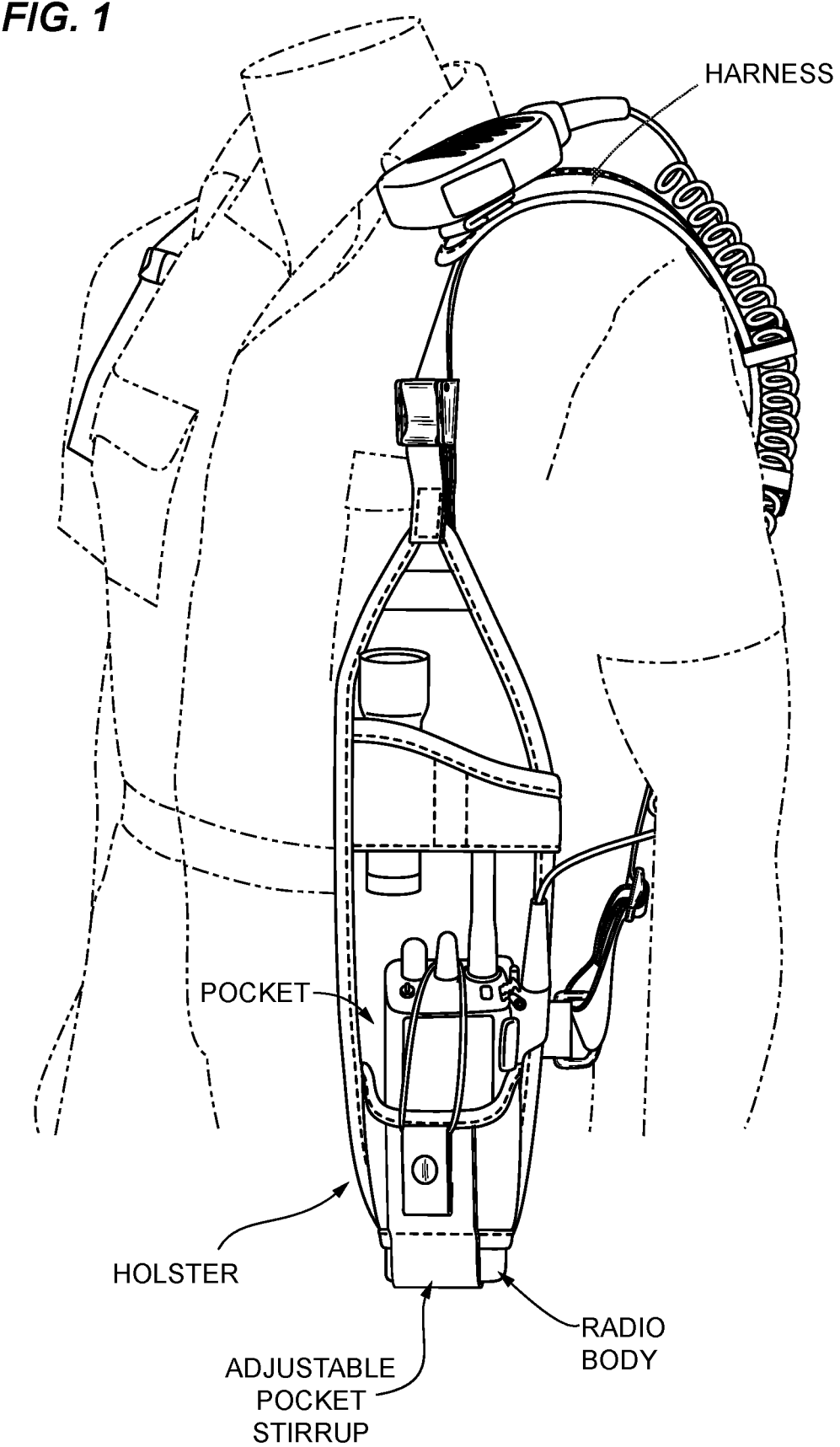
FIG. 1 is a view of a holster as a modular part of a harness ensemble in a typical condition of use, here over a shoulder. Shown is a radio transceiver in the holster pocket, a flashlight in a binding that also captures the radio antenna, and a microphone near the wearer's collar. The lower part of the radio can be seen to be seated in a "stirrup" webbing that is sewn into the front of the pocket and secured in the back with an adjustable contact fastener.

The drawing figures are not necessarily to scale. Direction of motion or coupling of views may be shown by bold arrows or boxed figures without further explanation where the meaning would be obvious to one skilled in the arts. Certain features or components herein may be shown in somewhat schematic form and some details of conventional elements may not be shown in the interest of clarity, explanation, or conciseness. It is to be expressly understood that the drawings are for illustration and description only and are not intended as a definition of the limits of the invention.

DETAILED DESCRIPTION

Although the following detailed description contains specific details for the purposes of illustration, one of skill in the art will appreciate that many variations and alterations to the following details are within the scope of the claimed invention. The following glossary is set forth as an aid in explaining the invention as claimed.

Glossary and Notation

Certain terms are used throughout the following description to refer to particular features, steps or components, and are used as terms of disclosure and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

"Fabric" Generally the invention is made by assembling layers of a fabric or film, typically using stitching or adhesives. Fabrics may include woven nylon or polyester sheets and webbing, some of which are lined with polyurethane for extra strength and water resistance.

"Webbing" refers to a fabric or film having limited stretchability and may be provided in sheets or rolls.

"Electronic device" may refer to a two-way radio, a walkie talkie, a cellular telephone, a camera, a notebook computer, a compact laptop; a voltmeter, a barcode reader, a label maker, a meter reader, and so forth.

"Hook-and-loop" contact fasteners relate to an interface having a first sheet of a material having on one face a plurality of fibrous hooks and a second sheet of material having on one face a plurality of pile-like loops, the two sheets having the capacity to interbind to each other so as to form a reversible but secure bond for holding the first sheet to the second sheet when contacted. One such common material is supplied under the trademark VELCRO® brand contact fastener, a trademark of Velcro BVBA of Manchester, N.H.

"Parallelepiped" refers to a body having generally planar faces with opposite faces being parallel. With reference to electronic devices, many such devices are sized to be hand held and are generally rectangular in cross-section, having opposite faces that are parallel. Such devices typically define a long axis, a front, a back, and two sides, in which the long axis extends from a base to a top of the device. Frequently, controls for operating the device are placed on the top and on the sides of the device, and any display panel is placed in the top front of the device. Examples include walkie talkies (i.e., while not limited thereto.

"Portable electronic device" may refer to a two-way radio, a cellular telephone, a camera, a notebook computer, a compact laptop; a voltmeter, a barcode reader, a label maker, a meter reader, and so forth.

General connection terms including, but not limited to "connected," "attached," "linked," "coupled," "conjoined," "secured," "mounted", and "affixed" are not meant to be limiting, such that structures so "associated" may have more than one way of being associated.

Relative terms should be construed as such. For example, the term "front" is meant to be relative to the term "back," the term "upper" is meant to be relative to the term "lower," the term "anterior" is meant to be relative to the term "posterior," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation.

"Adapted to" includes and encompasses the meanings of "capable of" and additionally, "designed to" or "so as to", as applies to those uses intended by the patent. In contrast, a claim drafted with the limitation "capable of" also encompasses unintended uses and misuses of a functional element beyond those uses indicated in the disclosure. *Aspex Eyewear v Marchon Eyewear* 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates. Also, the phraseology and terminology used herein is for the purpose of description and should not be regarded as limiting. When describing the claimed inventions, unless the context requires otherwise, and throughout the specification, drawings and claims, the use herein of "including," "comprising," "comprised of", "which comprises", "having", "containing", or "involving", and variations thereof, is meant to encompass the items described, pictured or named and equivalents thereof as well as an additional features or items compatible as assemblies or accessories, but not shown. Further, the appended claims are not to be interpreted as including means-plus-function limitations, unless a given claim explicitly evokes the means-plus-function clause of 35 USC § 112 para (f) by using the phrase "means for" followed by a verb in gerund form.

DETAILED DESCRIPTION

FIG. 1 is a view of a first embodiment, in this instance a radio holster as part of a combination of bindings in a typical context of use: here a shoulder harness. Also shown is a microphone mounted near the wearer's collar. The lower part of the radio is seen to be seated in a holster pocket. A surrounding "sleeve" forms the walls of the pocket and a "stirrup-like" webbing member forms the bottom. The radio is held in place at the top by a loop of elastic cordage stretched over the top of the radio. As will be described below, the depth of the pocket is adjustable. Also shown is a flashlight in the binding. The upper binding captures the radio antenna. In contrast, the teaching of U.S. Design Pat. No. D370776 is to hang the antenna of the radio upside down from a holster, in what would seem a prescription for damage to the antenna stalk; even by sitting down. As described here, the radio is in a natural operating position, is easily reached and operated without removal from the holster, can be operated hands-free if the device is so enabled, the antenna is secured, and the holster in its harness is comfortable to wear.

Figure 2:
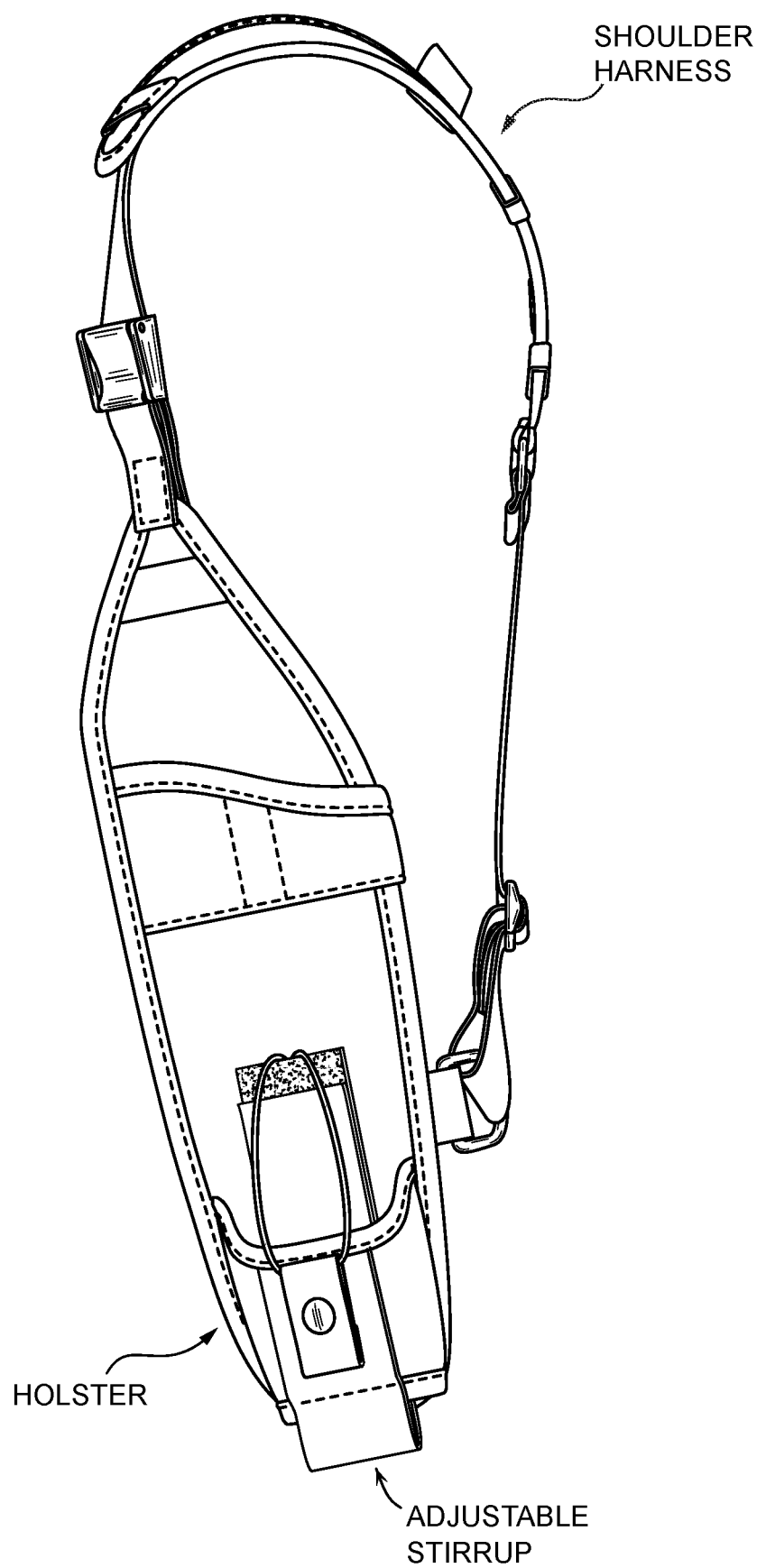
FIG. 2 is a view of a holster and pocket as part of a shoulder harness ensemble.

In FIG. 2, the radio is removed. Shown is a radio holster with open pocket as part of a shoulder harness ensemble. The pocket, elastic cord with snap clip, and stirrup webbing are more clearly seen in this view. The stirrup is relaxed because it carries no weight when empty. The combination of radio holster, upper binding, and shoulder harness is built up from layers of fabric; the stitched edges are trimmed to be neat and durable. The lip of the pocket rides low on the harness. Angling the side wall lips as shown has proved to guide and ease the entry of the radio into the pocket as will be described in more detail below. When in the pocket, the radio is secured on six sides by stretching an elastic loop over the top and fastening the elastic cord to the front lip of the pocket under a snap clip. Restraints are provided in the back, front, right, left, bottom and top faces of the radio (or other electronic device having generally parallelepiped device body geometry with six faces).

Figure 3:
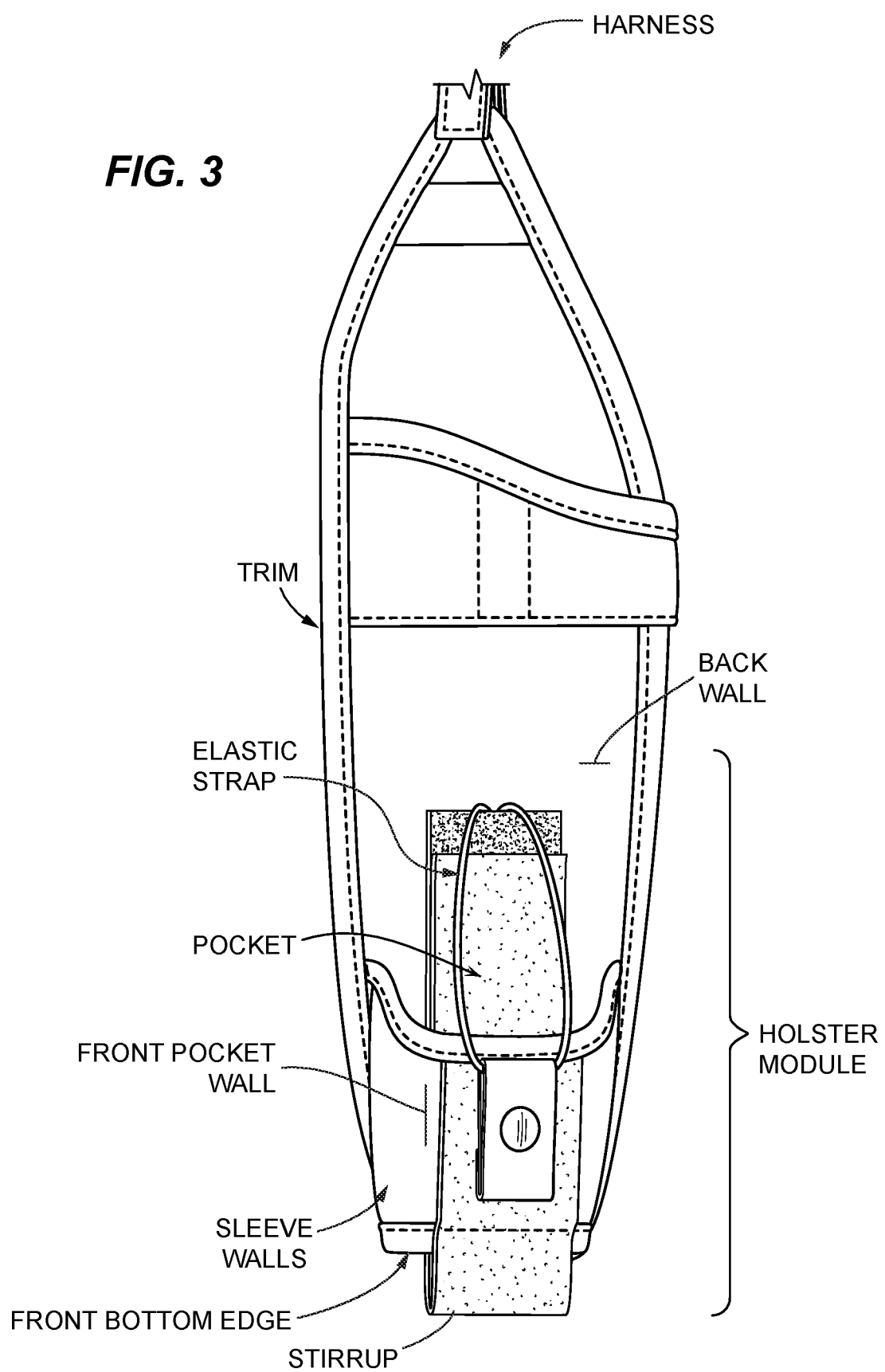
FIG. 3 defines the holster "subassembly" or "module" as having a pocket formed of four fabric walls (including a front wall and two side walls forming a "sleeve" sewn to a back wall), a stirrup webbing, and an elastic strap that make up a six-sided restraint system and form a closed loop encircling the radio from top to bottom.

FIG. 3 defines a holster as a "module" as having a pocket formed of four fabric walls (a front wall and two side walls formed from a "sleeve" sewn to the back wall of the pocket) and supported at the back by a substrate layer that is sewn into a harness. The bottom of the pocket is closed by a stirrup webbing, and an elastic cord over the top makes up a six-sided system of restraints. The back of the assembly may be double layered. The stirrup webbing reinforces the front pocket wall. In the harness assembly as an end product, the edges are trimmed for strength, durability and to prevent catching or rips. Details of the adjustable stirrup webbing will be described below.

Figure 4A:
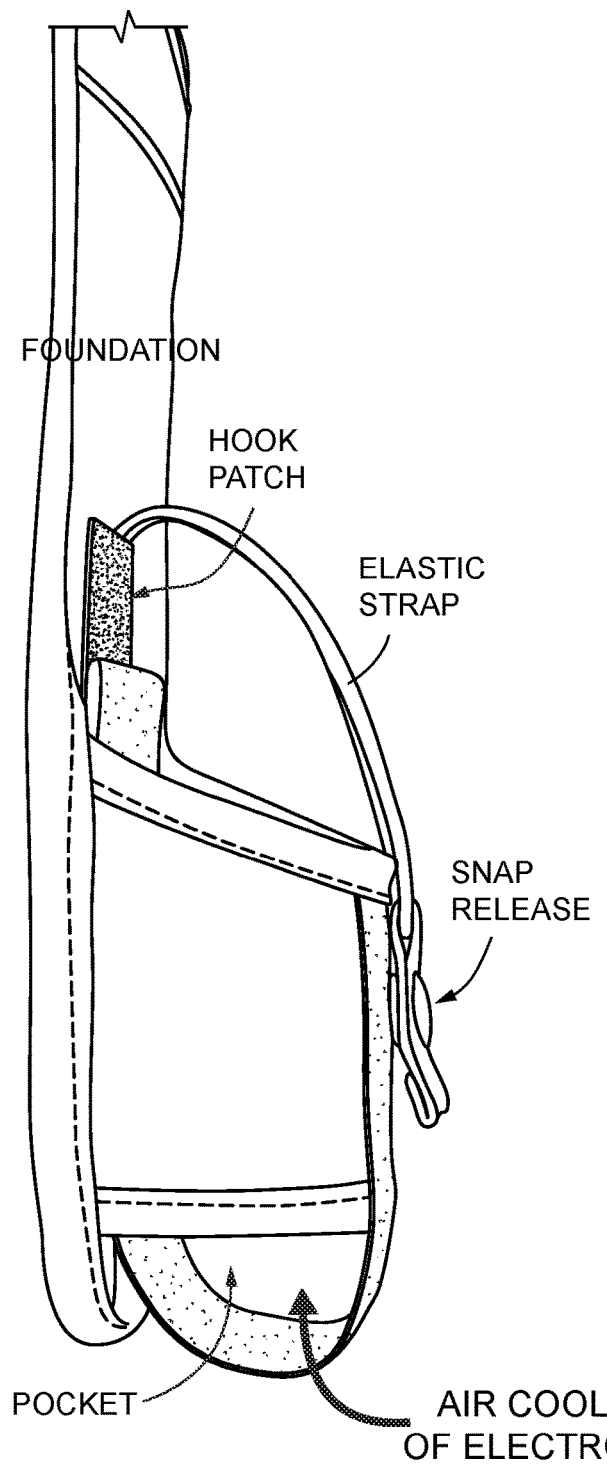
FIG. 4A shows a side view of the holster subassembly with pocket and trim. The structure is shown again in FIG. 4B, but without the radio.
Figure 4B:
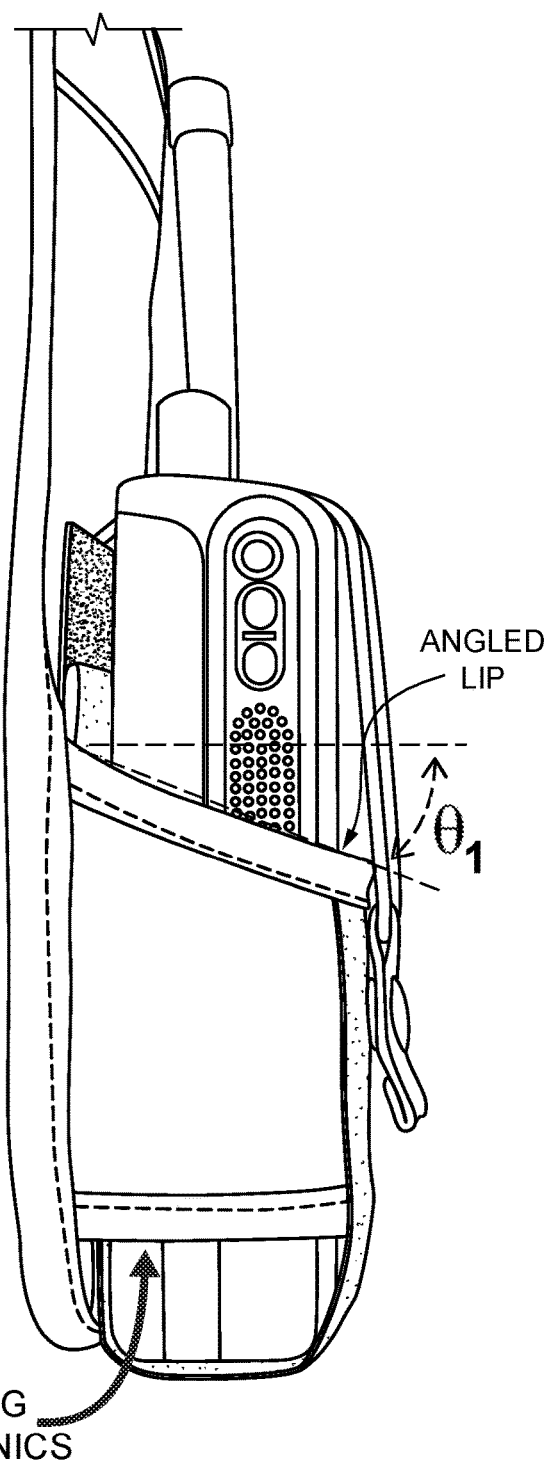

FIGS. 4A and 4B are side views of a holster with and without a radio. The radio is secured between the underside stirrup webbing and an elastic cord that is stretched over the upper surface of the radio and fastened to the front face of the pocket with a snap clip. As seated, the controls and other operating surfaces of the radio are easily accessible. The stirrup pulls against itself when supporting the radio, tightening the enclosure of the pocket around the radio.

It can be seen by tracing the elastic cord over the radio, continuing down the front pocket wall, around the bottom loop of the stirrup and up the back pocket wall, that the straps form a closed loop on all sides (FIGS. 4A, 4B). This "closed-loop securing system" engages and encircles the radio from top to bottom and eliminates any upward and downward motion of the radio in the compartment. The closed loop restraint system applies a constant pressure on the top, front, bottom and back of the two-way radio in the holster and is self-seating. Thus the system has two separate tensioning adjustments: the stirrup tongue is positioned so that the elastic cord tension is neither too much (overstretched) or too little (understretched); by working together a synergy is achieved in which any motion of the electronic device up or down is dampened and minimal. The elastic cord may also be adjustable if desired. Taken together, holster elements including the sleeve, pocket, stirrup, and loop of elastic cordage define an adjustable depth pocket, where the holster is configured with a six-element full surround restraint system enabled to carry and operate a portable electronic device of generally parallelepiped device body geometry with six faces, each face contacted with an element of the six-element restraint system. The holster is supplied with a six-element adjustable restraint system, an advance in the art.

The side openings around the stirrup provides ventilation for venting battery heat generated by the electronic device. These airflow ports at the bottom dissipate heat and also simplify cleanout. The airflow ports (FIG. 4A) allow for any heat buildup radiating from the device or batteries to escape from within the pocket. The ports also allow moisture to dissipate more quickly in a wet environment. The open ports allow the compartment to stay clean and prolong the life of the holster and the device by preventing accumulation of any dirt, dust and moisture buildup (that could have an adverse effect on the holster as well as the device). Because live electrodes can be exposed on electronic devices, the stirrup is a non-conductive material that is water resistant. A felt layer on the inside of the sleeve (front and side walls) promotes and protects display windows from scratching. The fabric of the back wall is relatively compliant so that the harness is comfortable and hangs naturally against the torso. The side walls provide essentially a six-sided grip on the radio on all axes.

Use of a cord instead of a pocket flap ensures that the operator has full access to the radio controls. Radios of this type are operated with one hand or in a hands free mode while the operator engages in other activities. By experience, the operator can trust the holster to secure the radio under any vigorous activity.

Open access to the buttons and plugins needed to operate the radio is achieved in conjunction with the downward parallel angulation of both side walls and the adjustable stirrup depth, which allows the operator to raise and lower the radio unit to a preferred operating position and keep it there.

The lip of the sleeve forming the side walls is angulated to help guide the radio when inserted into the pocket. The angled side lip feature of the pocket that has proved surprisingly useful in easing and guiding insertion of a radio, for example, into the empty pocket and is synergic by increasing the accessibility of radio control surfaces. The operator quickly discovers that by inserting the electronic device in a somewhat horizontal orientation, the heel of the device is arrested by the back wall of the pocket and the sides of the device drop in between the beveled surfaces of the side walls. The angulation of the side walls also ensures that the holster will self-align the device on the front lip of the pocket. Once the heel of the device is resting in the angled slot between the side walls, then by tipping the device to a vertical position, the heel of the device simply drops into the pocket and seats in the stirrup. This feature also relies on making the width of the front wall (and hence width of the slot between the side wall bevels) slightly more narrow than the back of the pocket, so that the act of putting the heel of the device in the slot ensures that when it slips down into the pocket, it is self-aligned and centered on the stirrup. This action quickly becomes intuitive and is described figuratively in FIGS. 6B and 7.

Figure 5:
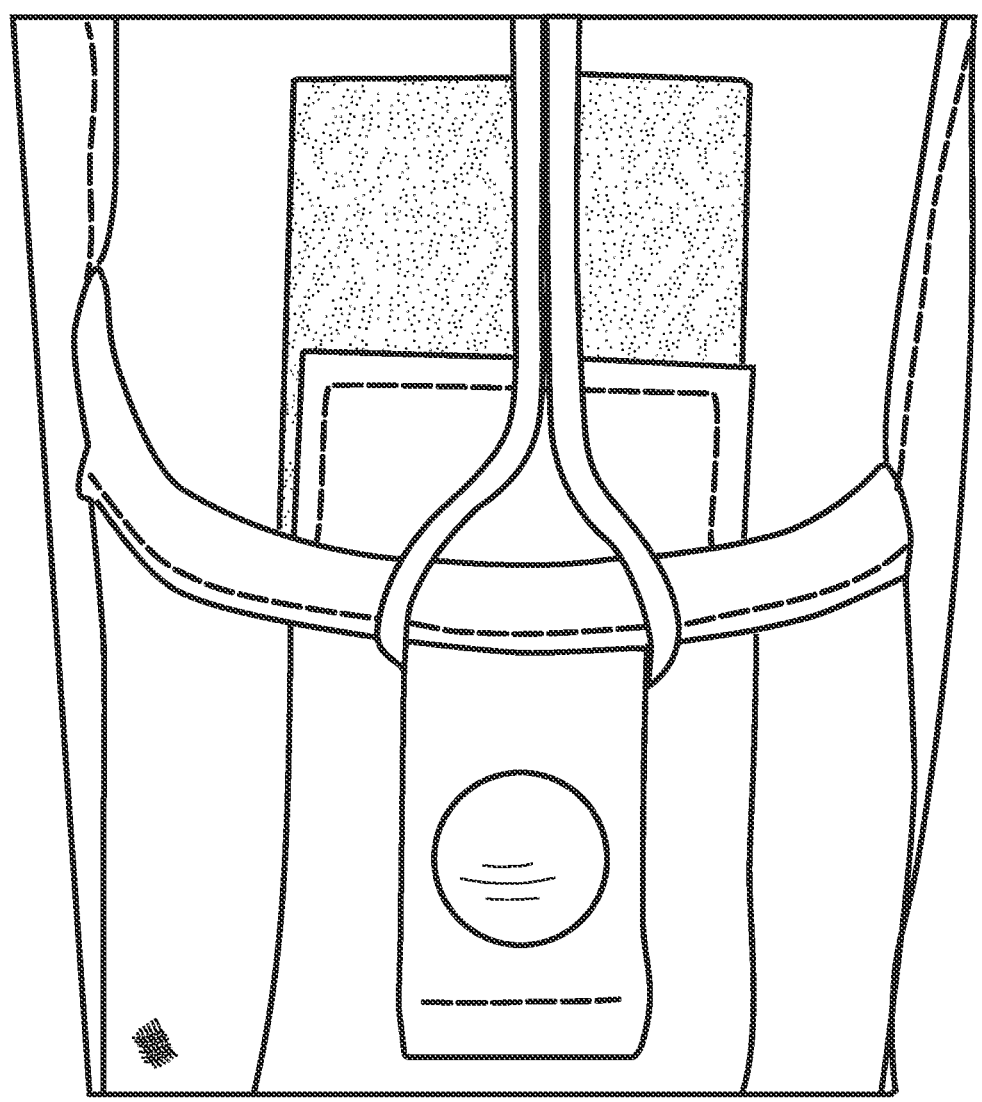
FIG. 5 is a photograph with construction detail front view of the pocket, angulated side walls, and elastic cord with snap clip.

FIG. 5 is a photograph with detail front view of the pocket, angulated side walls, and elastic cord with snap clip. Durable trim and stitching provide years of wear.

Figure 6C:
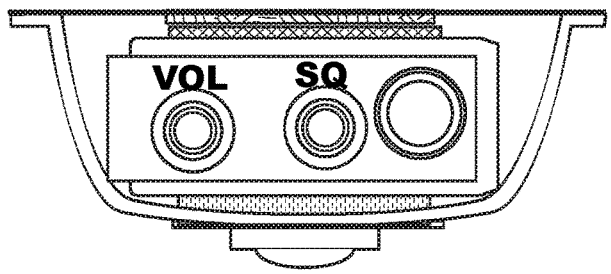
FIGS. 6A, 6B and 6C are a front view, an action side view, and a plan view of a pocket with self-aligning capacity for receiving a radio. The angle $\theta_1$ refers to the side wall lip.
Figure 6B:
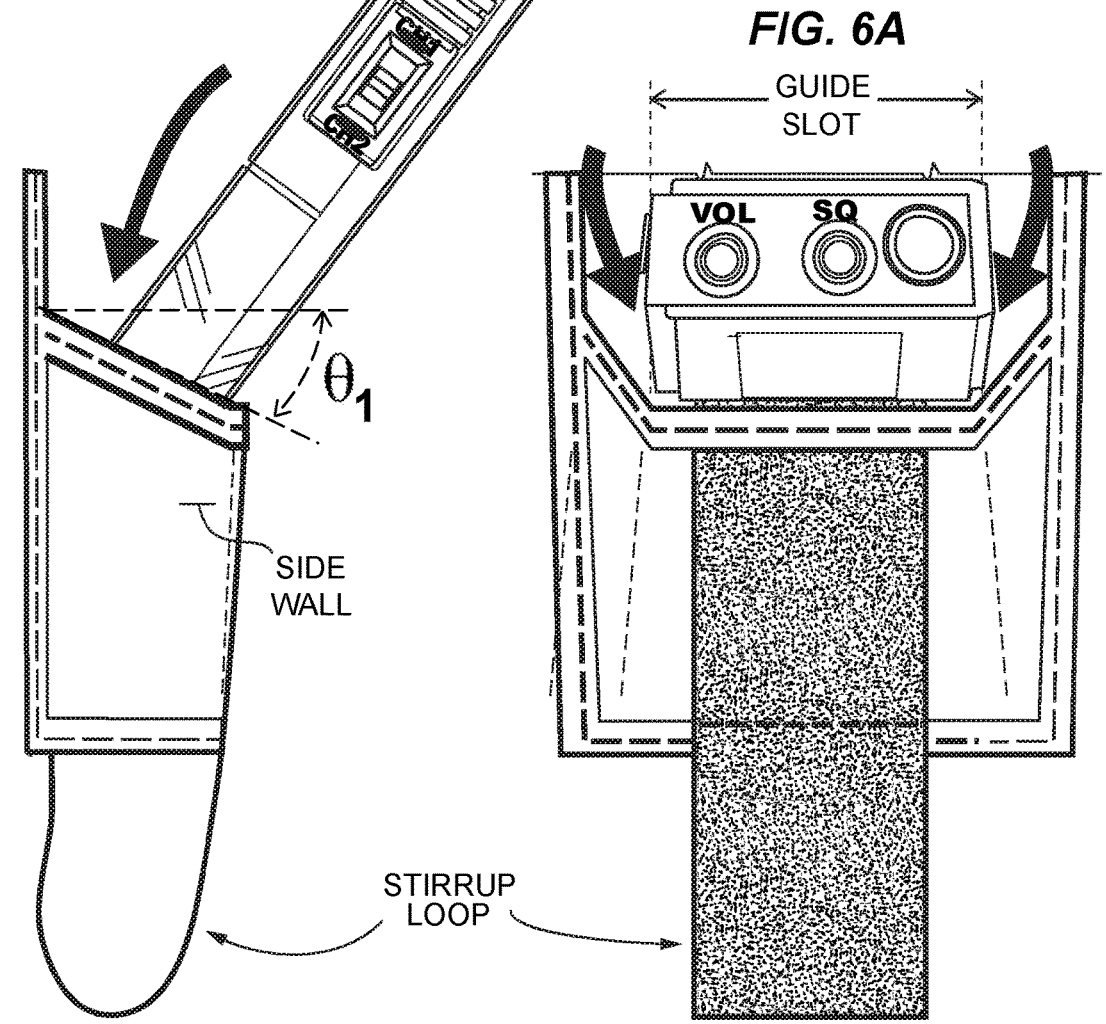
Figure 6A:
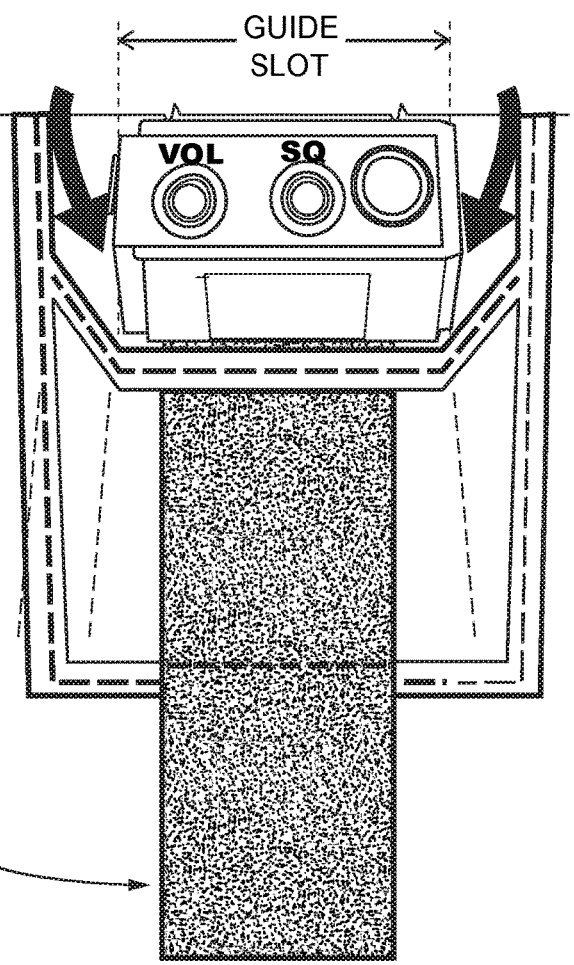
Figure 7:
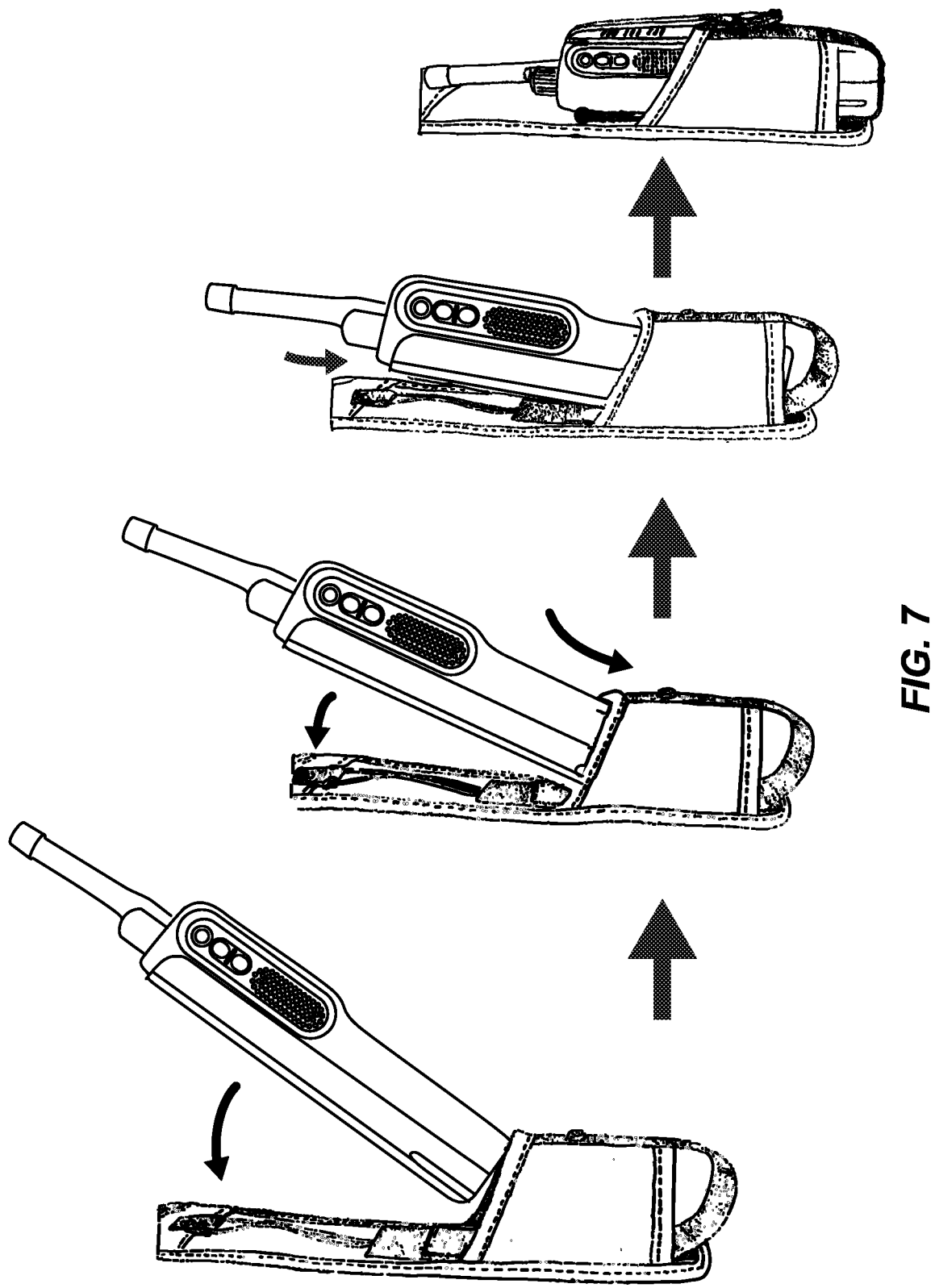
FIG. 7 is a sequential action view (with four "snapshots" in series) showing a method of inserting a radio into the pocket in which the pocket is structured with an angulated side lip so as to self-align the radio during the insertion process.

FIGS. 6A, 6B and 6C are a front view, an action side view, and a plan view of a pocket with an advantageous self-aligning capacity for receiving a radio. The angle $\theta_1$ refers to the side wall lip. By sloping the side wall lip as shown, the heel end of the radio or other rectangular cuboid electronic device will slip into the "guide slot" between the sloped walls as shown in FIG. 6A (marked "guide slot"). In FIG. 6B the view is a side view showing that the device is now centered in the slot and can slide easily into the pocket so that it is centered on the stirrup. FIG. 6C is a plan view demonstrating the device is centered between the angulated side wall lips when fully seated in the pocket. The key is the side wall slot formed by the sloping side wall lips. In one sense, by sloping the lips as shown, the side walls become a "pair of rails" that capture and steer the device body into the pocket. The heel of a radio is inserted with the radio body in a somewhat horizontal position as suggested in the end-on view of FIG. 6A. The heel then settles into the slot (paired bold arrows) and when rotated vertically (bold arrow) in FIG. 6B, surprisingly slides down into the pocket as guided by the slot into an essentially center rest position (FIG. 6C).

FIG. 7A describe the self-aligning insertion in a series of action views showing a method of inserting a radio into the pocket in which the pocket is structured with angulated side walls so as to self-align the radio during the insertion process. This sequence is shown with a time lapse series of renderings. Self-centering of the two-way radio is achieved when the radio is being inserted into the compartment. At the beginning of this self-centering process the top portion of the two-way radio will be slightly angled outward away from the compartment. The lower portion of the radio will be angled inwards towards the compartment opening where the bottom of the radio will make first contact on top edge of the front wall, as the radio proceeds into the compartment the downward angled side walls will eliminate any obstructions to the radio as it enters the top compartment area allowing for a seamlessly and continuously motion of the radio, by the time the radio touches the back wall the difference in the front wall width and the compartments back wall width will act as a guide for the radio to follow until the radio is in its final vertical resting position while in the holster.

Figure 8A:
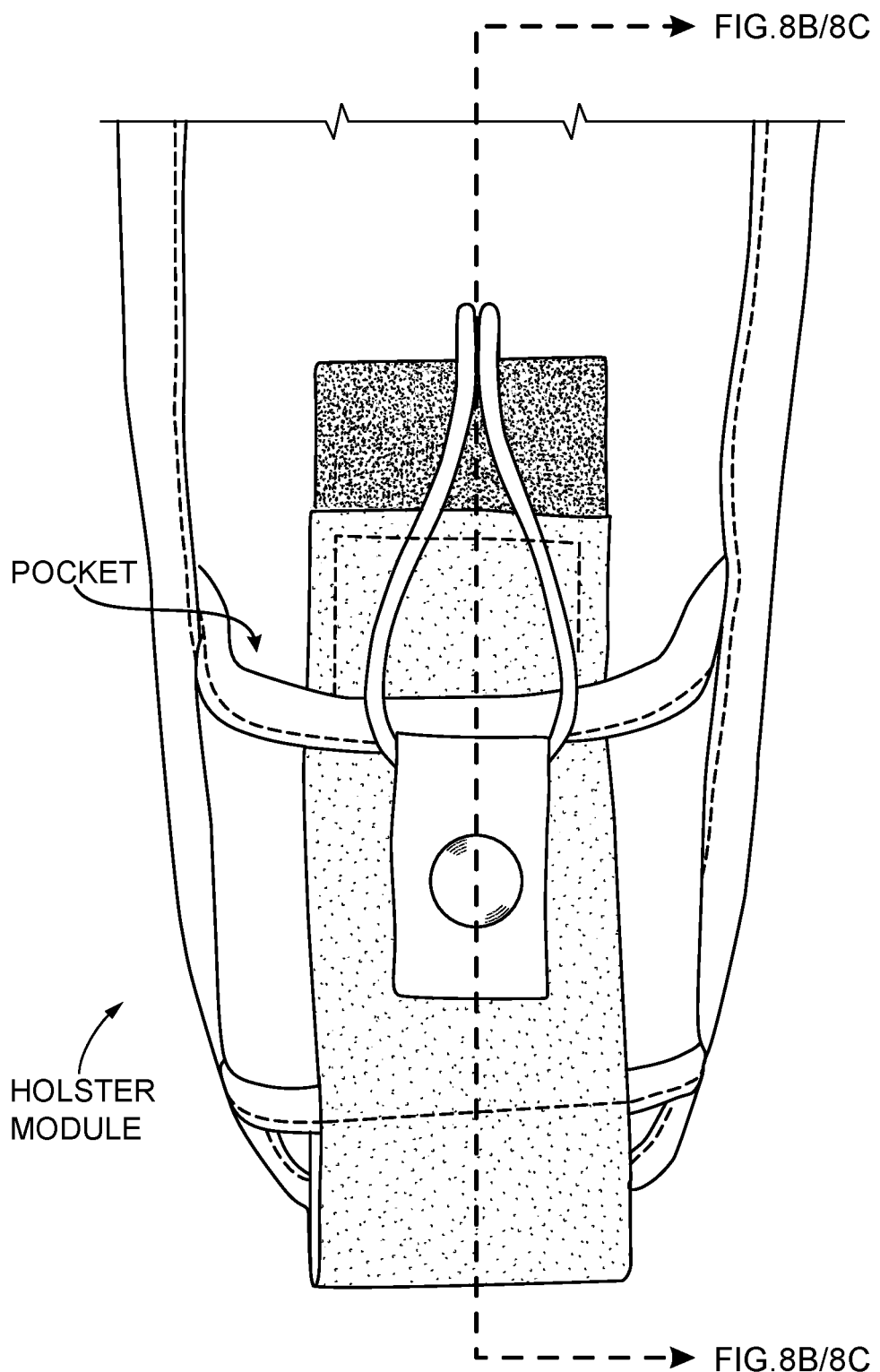
FIG. 8A is a detail drawing of the pocket in front view and also shows a section line for reference to FIGS. 8B and 8C.
Figure 8B:
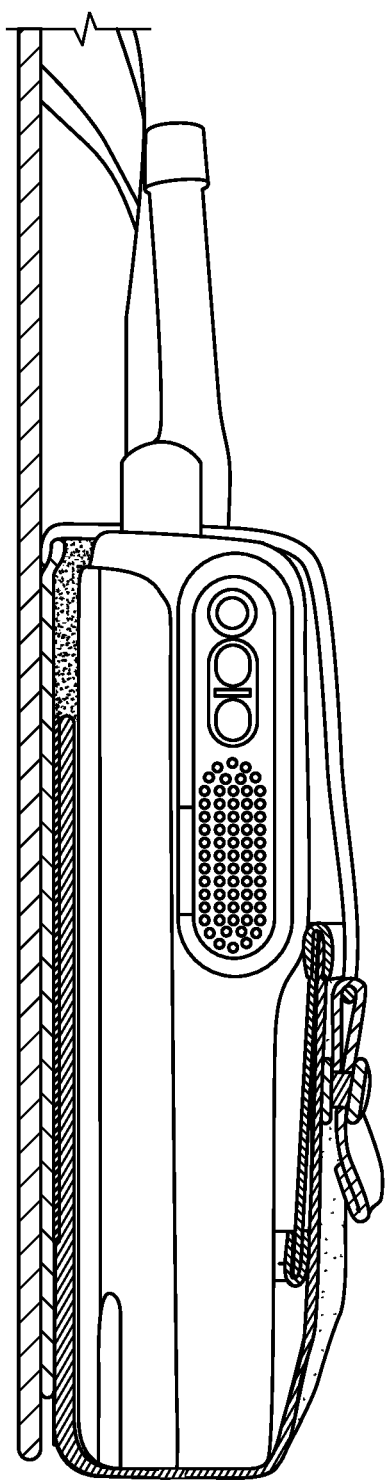
Figure 8C:
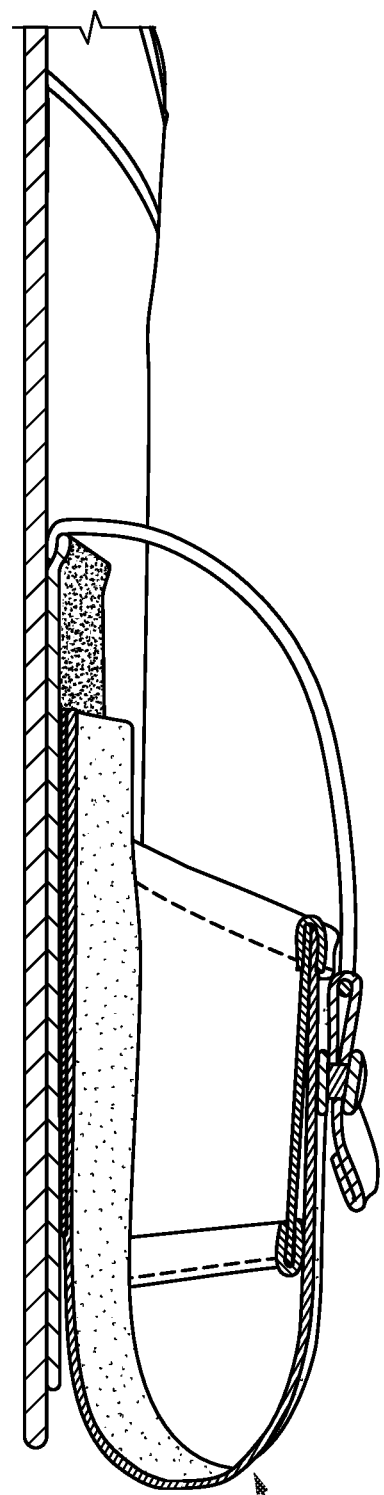

FIG. 8A illustrates the holster and pocket structure in more detail. Also shown are section lines referring to FIGS. 8B and 8C. In section view 8B the radio is shown to be snugly fitted, not because the pocket is designed for a particular radio, but because the pocket forms itself around the block body form of the device, while allowing clear access to controls, and the pocket depth is adjustable.

The pocket "stirrup" is held in place by a hook-and-loop interface on the back wall that cannot be disengaged without first removing the electronic device. The stirrup webbing that enters the bottom portion of the compartment also has Velcro attached to the surface that will make contact with the back wall's Velcro, when both sides of the Velcro are pressed together they create a strong bond. That bond creates the support for the bottom wall and also allows the same strong bond to support the end of the stirrup webbing when its attached in succession from the lower portion of the back wall to the upper portion of the back wall or anywhere in between creating a plurality of depths for the compartment allowing the compartment's depth capabilities the adjustments necessary for the two-way radio in the compartment to be raised or lowered to meet the needs to hold, contain and secure the two-way radio in the holster proportionally regardless of the various height dimensions of a two-way radio.

The depth/height adjustment capabilities is only achieved while the radio compartment is empty such that only then can the user measure and determine the exact location where the back wall Velcro and the Velcro end of the stirrup webbing that enters the bottom of compartment should be attached to accomplish the proportional depth adjustment for the height of the two-way radio and achieve access to the buttons and plugins on the two-way radio, and once adjusted is permanently adjusted for any radio of the same dimensions.

The combination of the back wall with the general purpose side of the Velcro facing inwards towards the compartment and the other side of the Velcro's general purpose side attached to the end of the stirrup webbing that enters into the bottom portion of the compartment and attaches to the back wall's Velcro allows for a strong bond that supports the bottom wall.

Figure 9A:
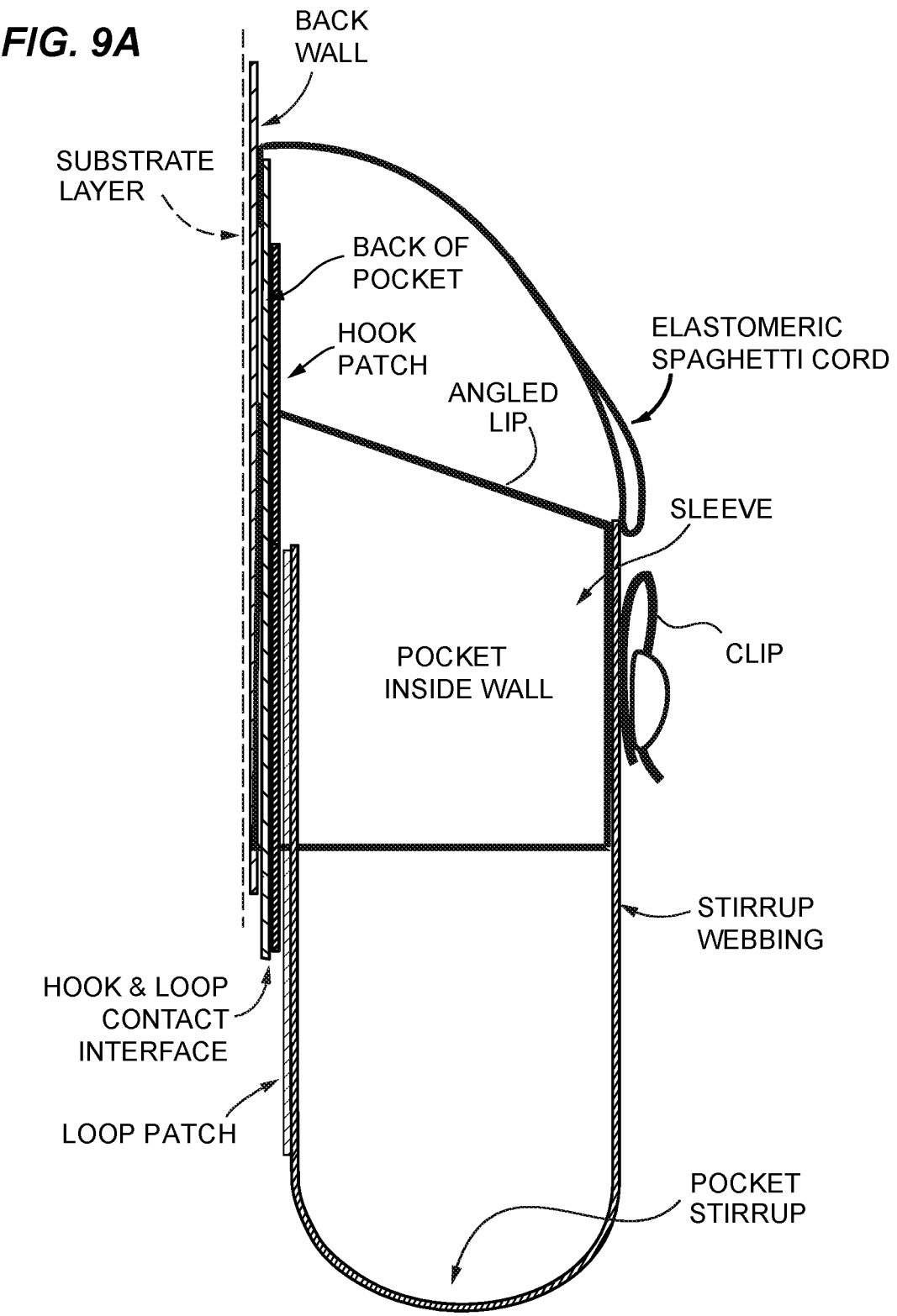
FIGS. 9A and 9B are schematic views in section and perspective to demonstrate the pocket and stirrup structure, the angled lip of the pocket, and the bottom of the pocket formed by a U-shape of the adjustable stirrup.
Figure 9B:
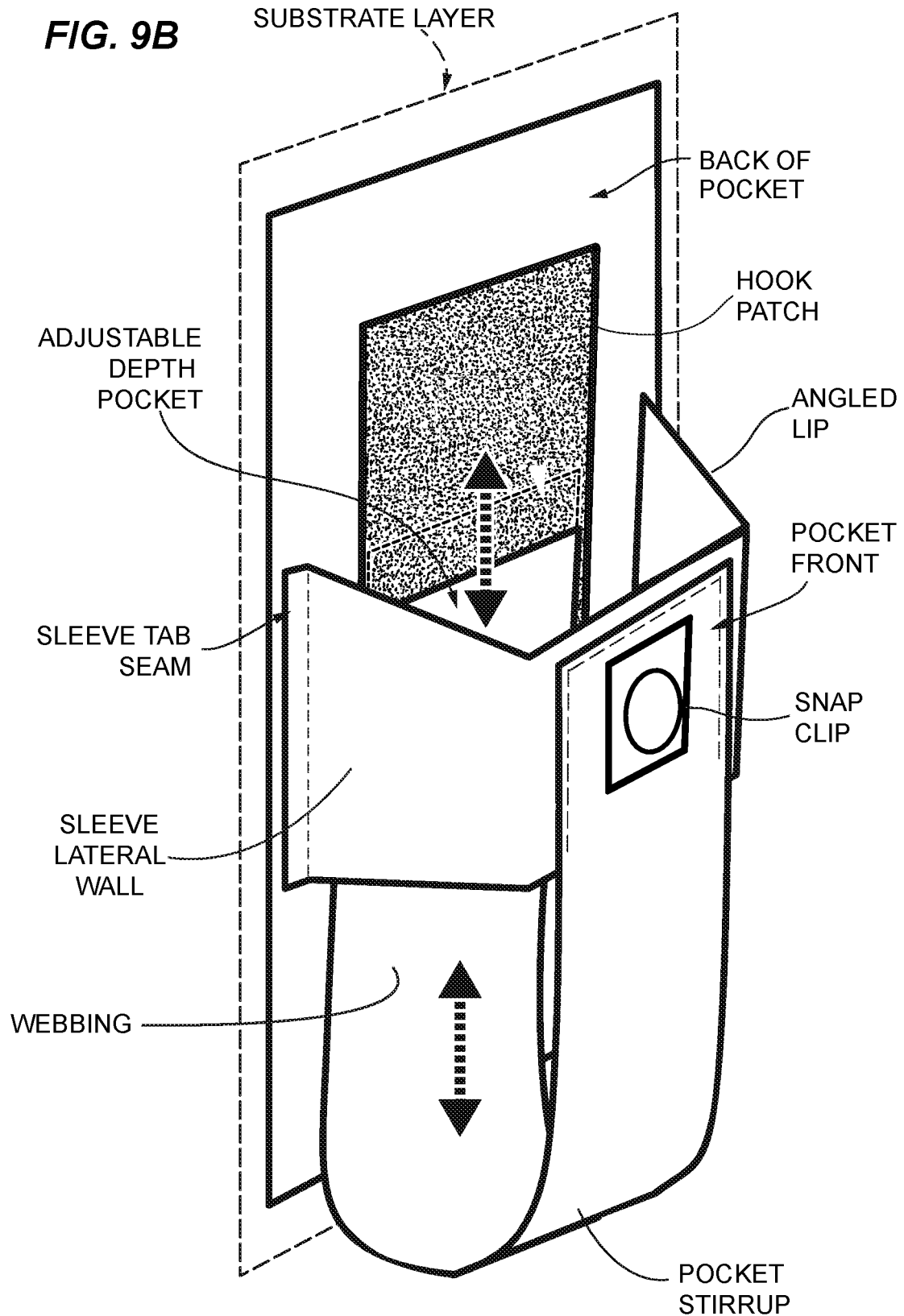

FIGS. 9A and 9B demonstrate the gripping action of the pocket and also illustrate how the structure is built up with layers and structure that includes a substrate layer, a back pocket wall, and a strip of material configured as a hook-type contact grip patch. The pocket includes three anterior walls (front and two sides) and is sewn onto the back wall with seams that are later covered by the trim. A strip of webbing, termed here a "stirrup" loops down from the front and back up inside the pocket, where it is adjustably affixed to the back wall using a strip of material configured as a loop-type contact grip patch.

The holster is built up from a substrate layer that forms a double back wall of the pocket. The contact fastener is typically a hook-and-loop type contact fastener such as VELCRO® that lines the back wall of the pocket. The contact fastener allows the user to raise or lower the loop of webbing termed here the "stirrup". The amount of overlap between the two patches shortens or lengthens the stirrup.

As shown in FIG. 9A in elevation view, the stirrup is sewn onto the outside face of the front wall and reinforces it. A snap clip rivet is mounted in the stirrup webbing but does not extend through into the pocket. A tab of material sewn onto the upper front face of the stirrup webbing is folded over to receive the male part of the snap clip. The tab inserts through a loop of elastic cord and is snapped onto the rivet to stretch the cord over the top of the radio.

The sleeve that forms the front and side walls of the pocket is shown in FIG. 9B in a perspective view. The sleeve is sewn or adhered on the back wall of the pocket and the assembly is trimmed with stitching as depicted in more detail schematically in FIG. 10. A first end of the stirrup webbing is permanently sewn onto the front wall of the pocket and is adjustable only at the free end of the web material, where the free end is termed a "tongue". Thus, placing a radio inside the pocket has the effect of pressing the two contact fastener surfaces together so that only an extraordinary shear force can separate them.

Figure 10:
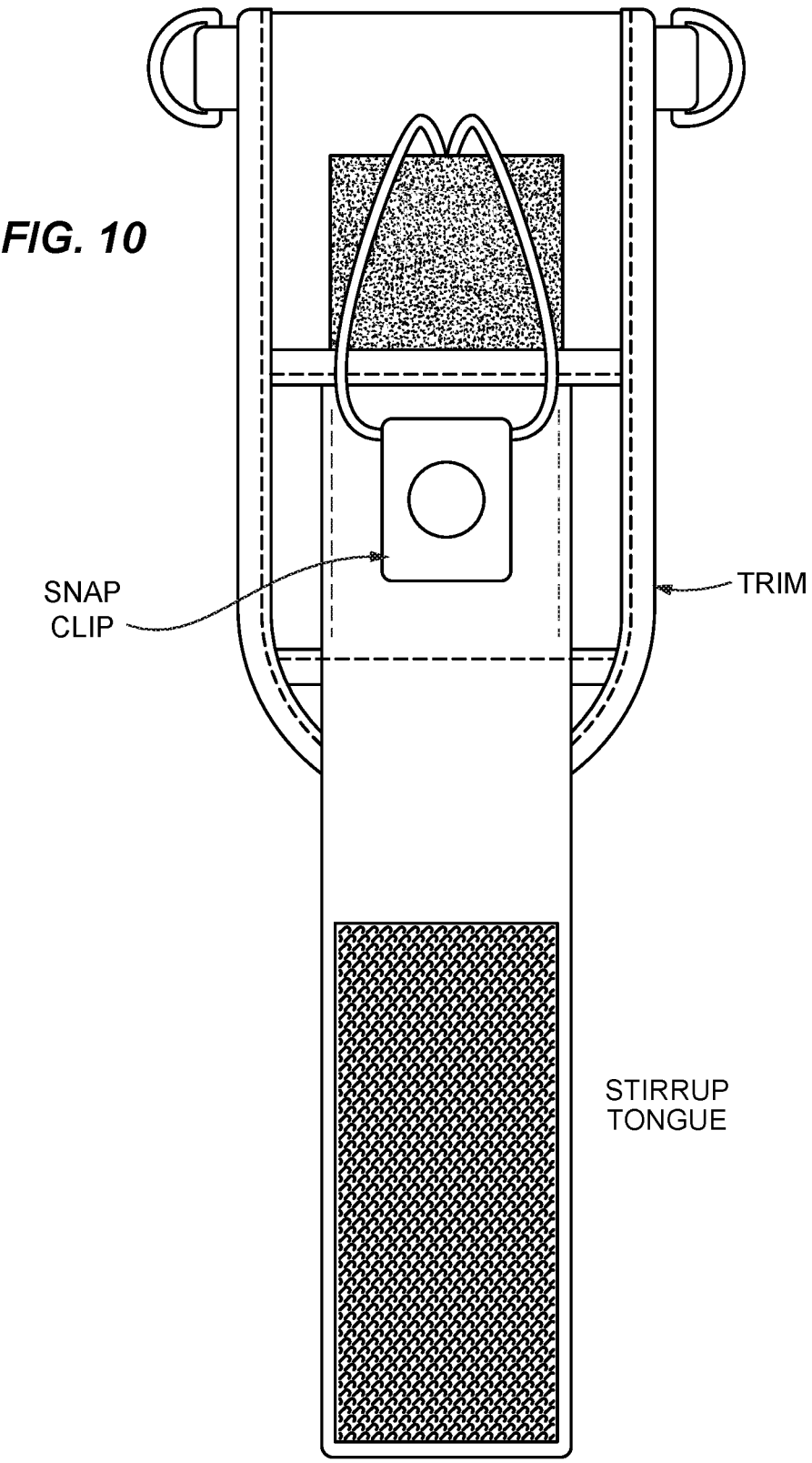
FIG. 10 is a schematic in plan view showing the general relationships of the parts and layers of the holster.

The closed-loop restraint system includes a contact patch attached to the back wall of the pocket. The top ends of the elastic cord are sewn under the contact patch. A loop of elastic cord (FIG. 10) is fastened by a snap clip just below the lip of the front outside wall. The stirrup webbing continues from the top edge of the front outside wall, where it is sewn in place, and the second end, when dis-attached, hangs as a long tongue as shown in FIG. 10. To cinch up the stirrup, the user inserts the free end of the stirrup inside the pocket from the bottom and presses it against the mating contact fastener mounted on the back wall of the pocket. This stirrup then serves as a bottom to the pocket and engages the bottom end of the radio unit. Because the elastic cord is sewn under the mating contact fastener, the component elements described here form a continuous restraint encircling the radio at the top and bottom when the elastic cord is buttoned into the snap clip.

The closed looped securing system is centered on the long axis of the pocket to ensure that the radio unit will be secured in the center of the holster so that weight is balanced and the airflow and clean out ports are not obstructed. Through experimentation, angulation of the side wall lips was discovered to result in self-centering when the radio is inserted into the pocket. At the beginning of the self-centering process, the top portion of the radio is slightly angled outward and away from the pocket. To insert the radio, the bottom end of the radio is angled inward and downward into the pocket. The radio first makes contact on top edge of the front wall, and as the radio drops into the pocket the angulated side walls guide the radio as it enters the top compartment area allowing for a seamlessly and continuously motion of the radio, by the time the radio touches the back wall the difference in the front wall width and the compartments back wall width will act as a guide for the radio to follow until the radio is in its final vertical resting position while in the holster.

The closed looped restraint system is achieved when the holster/compartment and all components that secure the two-way radio in the compartment are being used. The closed looped system will be engaged at this point and will eliminated all upward and downward motion of the two-way radio while in the compartment.

The closed looped restraint systems can be accomplished by starting at the top end of the Velcro that is attached to the back wall from there the top end of the upper securing strap is sewn under the top portion of that Velcro and then travels downward to the front outside wall of the compartment where the bottom end of the upper securing strap is fastened by a snap to the outside front wall. The stirrup webbing starts at the top edge of the front outside wall and travels downward towards the lower portion of the compartment from there the stirrup webbing will enter into the bottom of the compartment and create the bottom wall. The stirrup webbing that enters the bottom portion of the compartment also has Velcro attached to the surface that will make contact with the back wall's Velcro, when both sides of the Velcro are pressed together they create a strong bond. That bond creates the support for the bottom wall and completes the closed looped restraint system that will dampen all upward and downward motion of the two-way radio while in the compartment.

The closed loop restraint system applies pressure to the outside body walls from the top, front, bottom and back of the two-way radio being used in the holster it also provides a superior hold that brings peace of mind to the end user knowing the two-way radio will stay secured in the holster under any enthusiastic or rigorous activity.

Figure 11A:
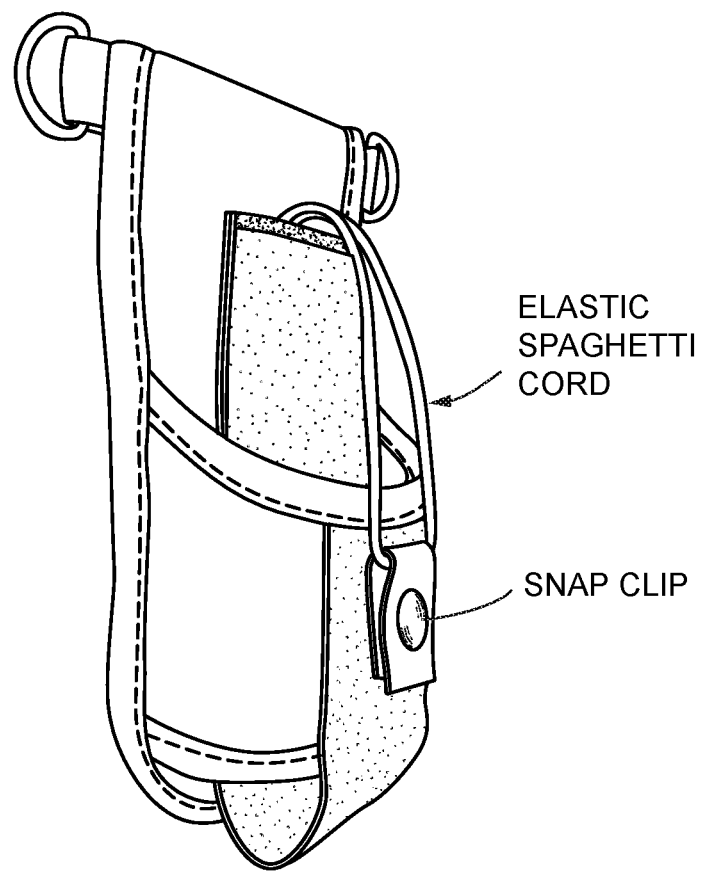
FIG. 11A is a rendering in perspective view to demonstrate the sleeve attachment tab and seam and the adjustable stirrup.

FIG. 11A is a perspective view of the layers of the holster pocket. The side walls and front wall of the pocket are assembled by sewing each end of a "sleeve" to the foundation layer. It can be seen that the stirrup webbing is a single strip or "tongue" that is affixed on the front face of the front wall of the pocket and is shaped as a "U" by turning the free end of the tongue up and into the pocket, where it is attached using a patch of a contact fastener to the back side inside wall. The precise positioning of the stirrup attachment may be raised or lowered by taking in or letting out the stirrup before pressing it against its mating contact fastener patch. In this way, the depth of the pocket is adjustable by the end user and is not fixed by the manufacturing process. At the top of the pocket, the elastic cord is inserted under the fastener and sewed in place. The cord extends as a loop so that it may be stretched across the top corners of the radio unit and captured under the tab of the snap clip. The view also represents a holster unit as a standalone product with D-rings for attachment.

Figure 11B:
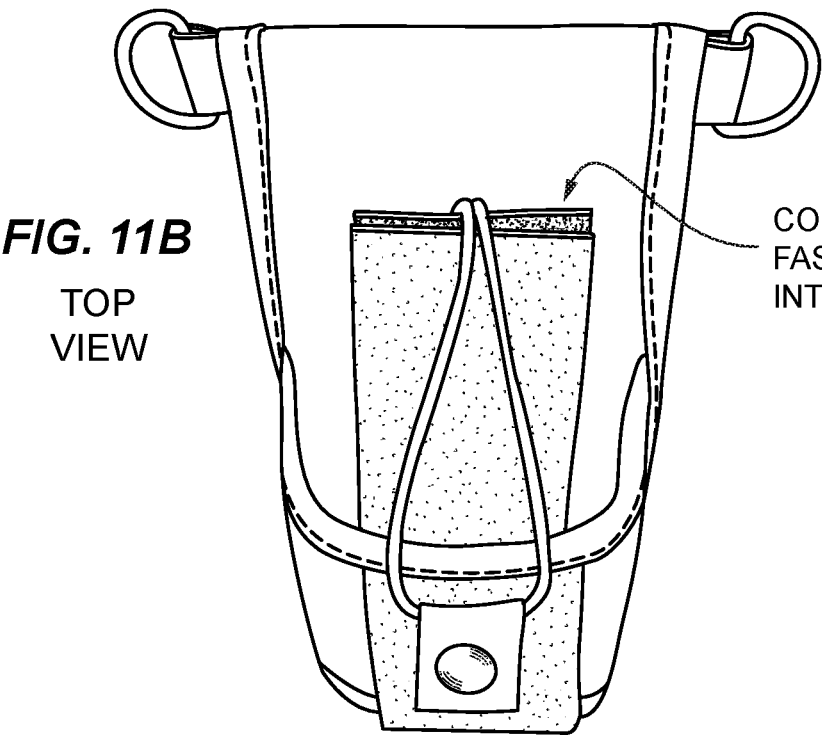
FIG. 11B is a rendering in front view showing a front view of the holster.
Figure 11C:
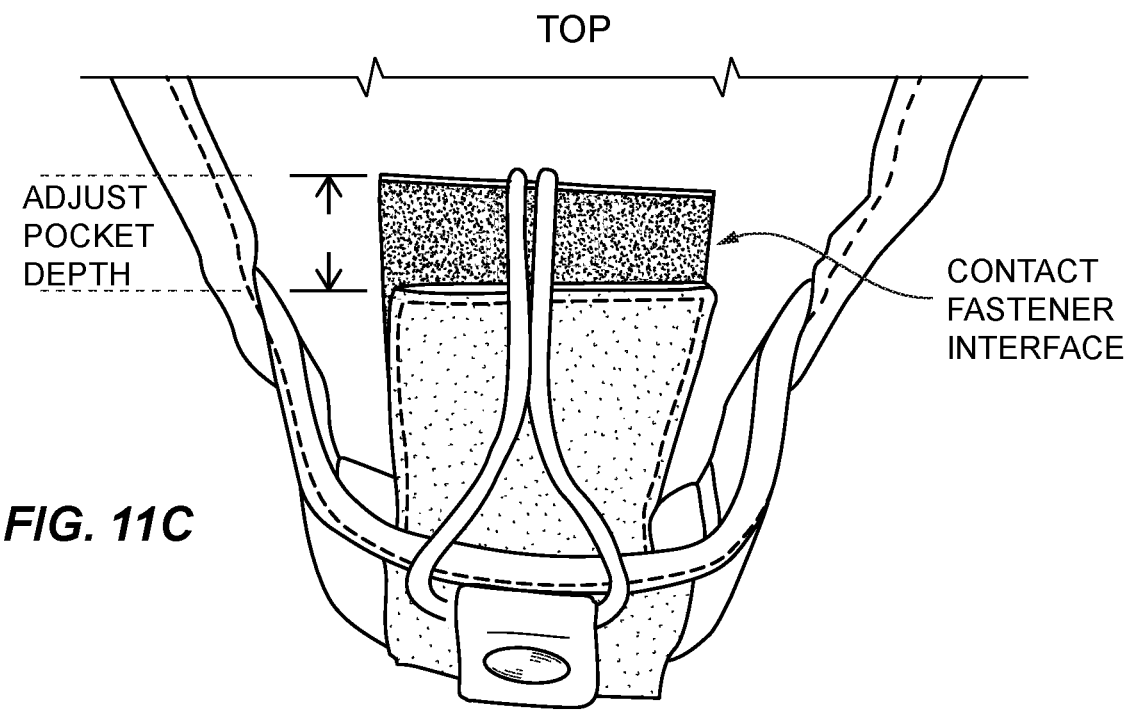
FIG. 11C is a rendering showing a front view down into the pocket.

FIG. 11B is drawn in perspective to show the stirrup webbing in a first position, as compared to its position in FIG. 11C where shown by the note "ADJUST POCKET DEPTH" on the contact fastener interface. The stirrup webbing has a contact fastener patch attached to the front surface and will contact with the back wall's mating fastener surface, when both sides are pressed together they create a strong bond. That bond creates the support for the bottom wall and also allows the same strong bond to support the end of the stirrup webbing when its attached in succession from the lower portion of the back wall to the upper portion of the back wall or anywhere in between creating a plurality of depths for the compartment. By raising or lowering the tongue of the stirrup on the contact fastener interface, the pocket depth is adjustable. An initial adjustment is frequently necessary for the two-way radio in the compartment to be raised or lowered to meet the needs to hold, contain and secure the two-way radio in the holster proportionally but subsequently the device will always return to the same depth in the pocket. The depth/height adjustment capability is only achieved while the radio compartment is empty. Only then can the user measure and determine the exact location where the back wall contact fastener and the mating fastener surface of the stirrup. The proportional depth adjustment for the height of the two-way radio optimizes access to the buttons and plugins on the radio. Once adjusted, the radio will return to the same position each time it is inserted into the pocket.

Figure 11D:
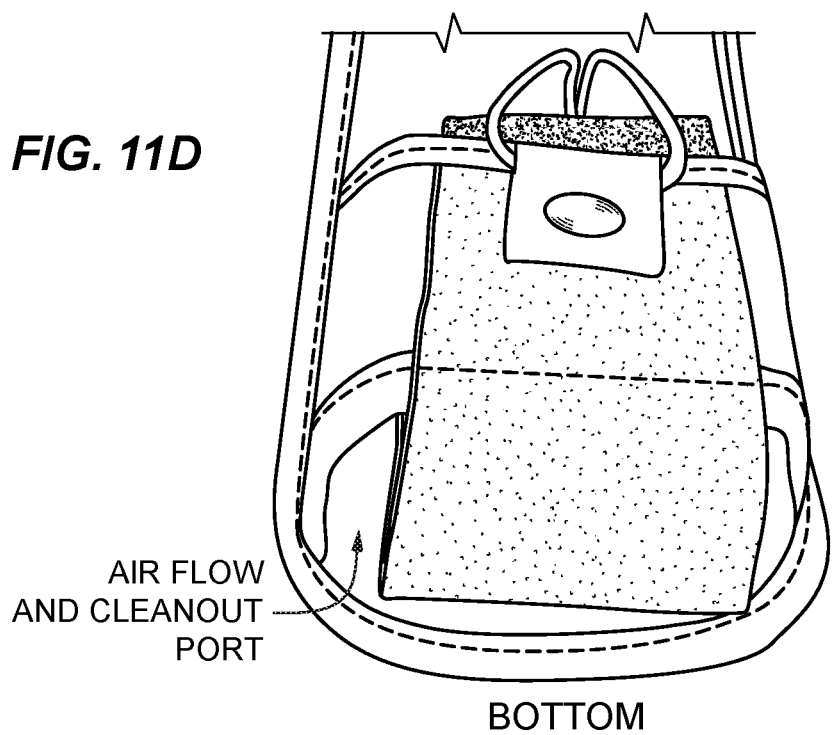
FIG. 11D is a rendering showing a bottom view of the holster.

FIGS. 11C and 11D are top and bottom views respectively of a holster pocket with "spaghetti" top loop and stirrup "bottom loop". The opening on each side of the stirrup webbing serves as an air flow and cleanout port.

Figure 12A:
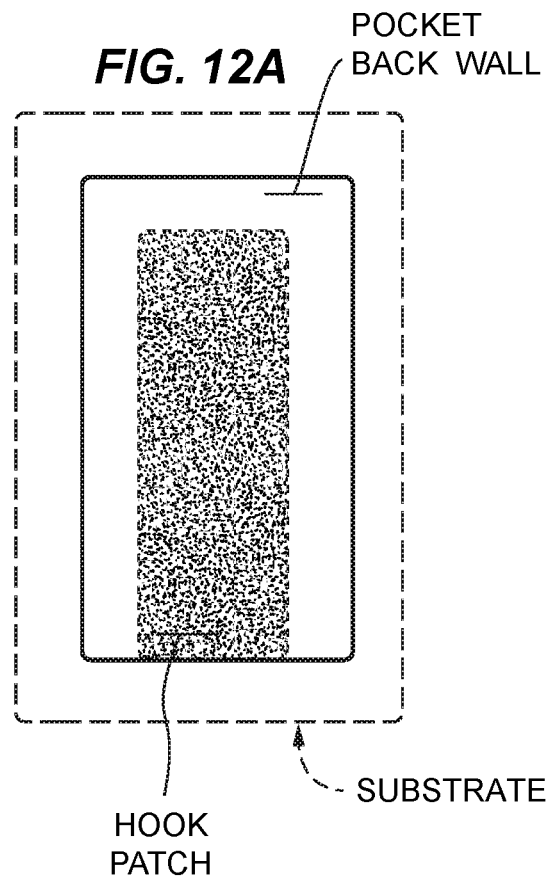
FIGS. 12A and 12B are front and side views respectively of the layers of a back wall and substrate of a holster pocket. Shown are a "spaghetti" elastic cord and a stirrup bottom loop or tongue, the tongue having a sewn-on loop patch of hook-and-loop type contact fastener for attaching to the pocket back wall.
Figure 12B:
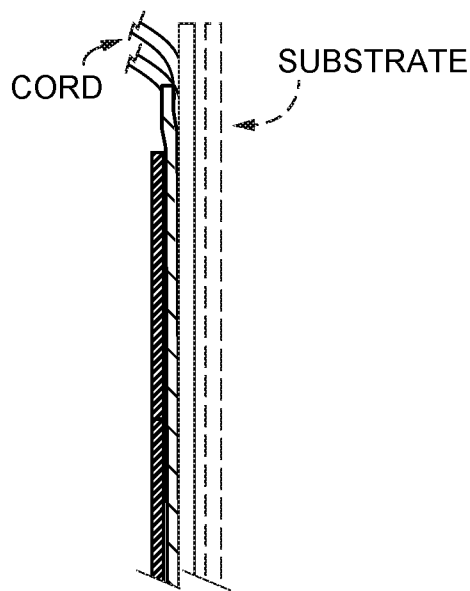

FIGS. 12A and 12B are views of the back of the pocket as a sub-assembly. Shown are front and side views respectively of the layers of a back wall and substrate of a holster pocket. Shown are the anchor point for a "spaghetti" elastic cord and a sewn-on loop patch of hook-and-loop type contact fastener for attaching to the pocket back wall. The back of the holster may have more than one layer. A substrate layer is generally also included to facilitate use of the holster as a "module" or "manufacturing intermediate" in construction of more complex combinations. The multi-layered construction of the back wall is termed here a "foundation". The size and shape of the foundation layer and any substrate layer that forms the backing for the sleeve and pocket is somewhat arbitrary, but margins of the foundation piece can be established so that the holster assemblies can be integrated into jackets, belts, pouches, shoulder harnesses, and complex end products as illustrated in but not limited to the exemplary embodiments shown in FIGS. 18 through 21. The foundation layer defines a manufacturing intermediate configured to be integrated into a larger production unit selected from a shoulder holster, a vest, a fanny pack, a carrying bag, a tool pouch, or belt, while not limited thereto.

Figure 13A:
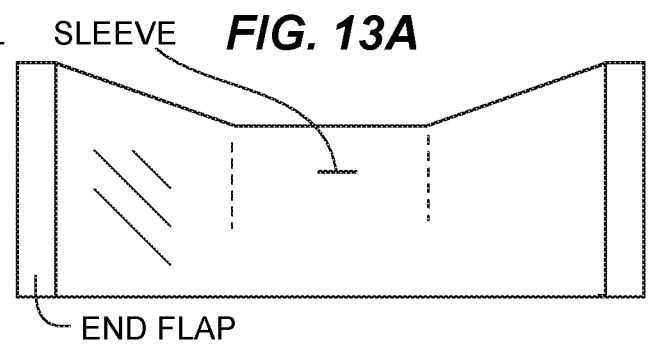
FIGS. 13A, 13B and 13C are schematics of an assembly process for a sleeve subassembly of a holster that includes three walls of the sleeve and the stirrup tongue.
Figure 13B:
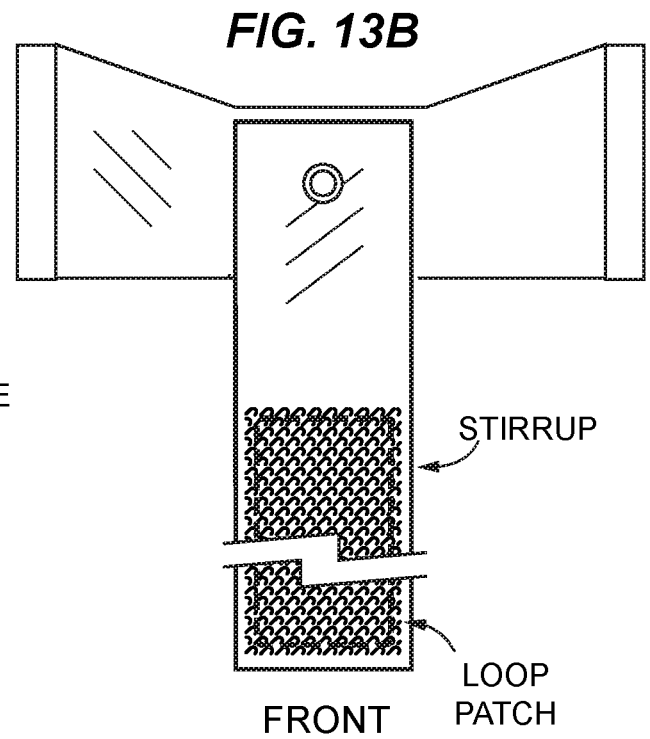
Figure 13C:
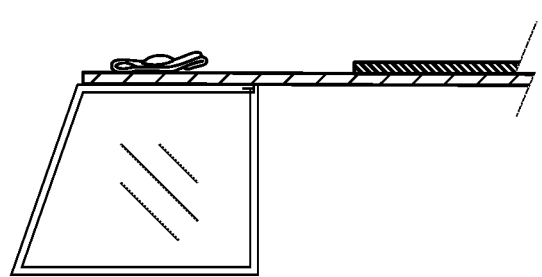

FIGS. 13A, 13B and 13C are schematics of an assembly process for an outside sleeve subassembly of a holster that includes three walls (front and two lateral walls) of the sleeve and the stirrup tongue, shown here with a strip of contact fastener material.

In a first operation, the sleeve is cut out and folded to form three wall panels (front and two lateral sides) and the lateral side ends are modified with tabs or "end flaps" that will be used to sew the sleeve onto the back wall of the pocket. In a second operation, the stirrup tongue is sewn onto the front wall and a rivet snap clip fitting is inserted through the front wall. The female part of the rivet is inserted into a small strap used to capture the elastic cord as shown in FIG. 14. The tongue includes a patch of hook-and-loop fastener material, generally the loop type, as a contact fastener. These items are shown in FIG. 13C in the completed subassembly and again in perspective view in FIG. 14.

FIG. 14 is a completed outside sleeve subassembly in perspective view and shows the extended stirrup or "tongue". The proximal end is sewn onto the outside surface of the front wall of the sleeve; the distal end is free, but includes a patch of a contact fastener material on the front face.

Figure 15A:
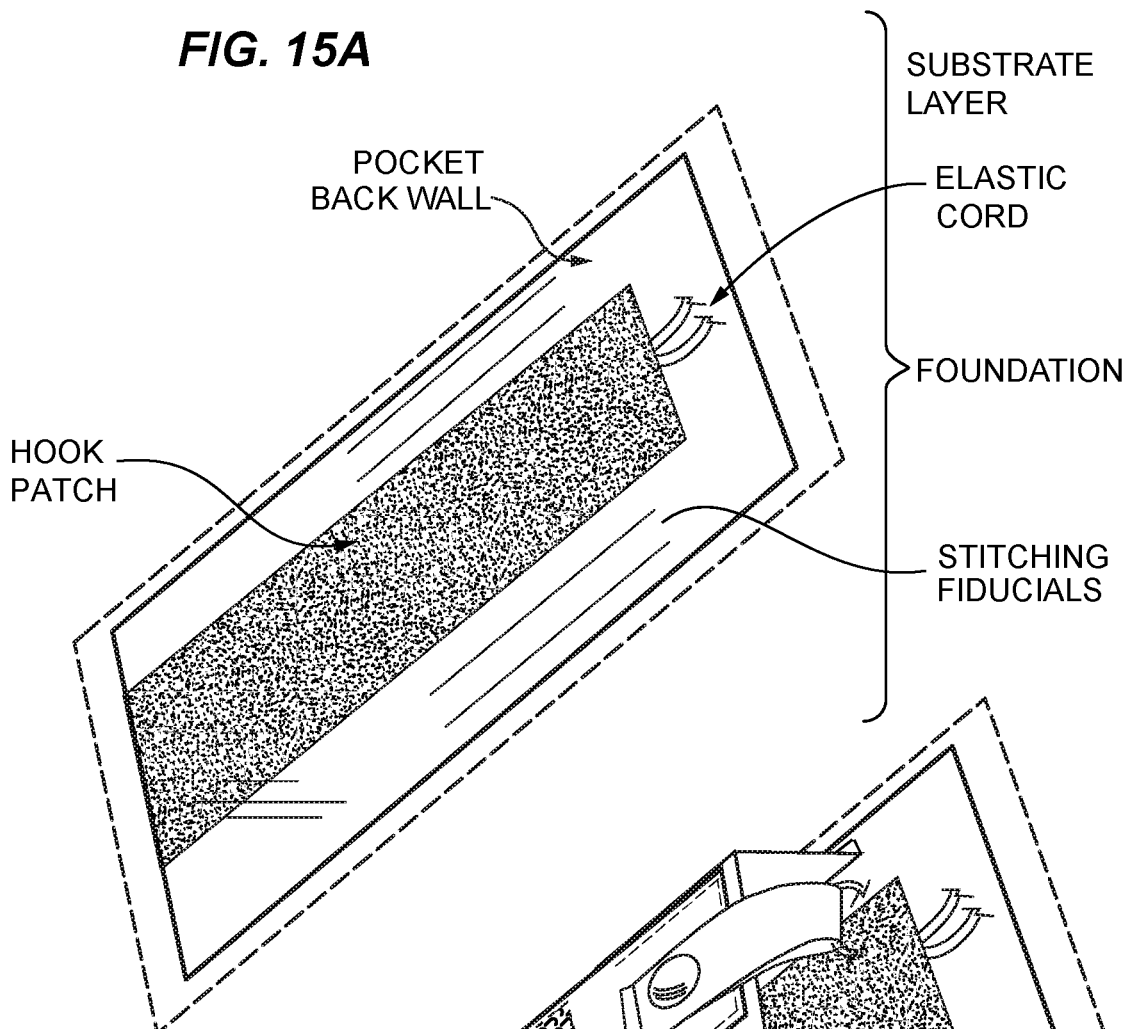
FIGS. 15A and 15B demonstrate schematically the attachment of the sleeve subassembly to a pocket back wall. Stitching fiducials guide assembly.
Figure 15B:
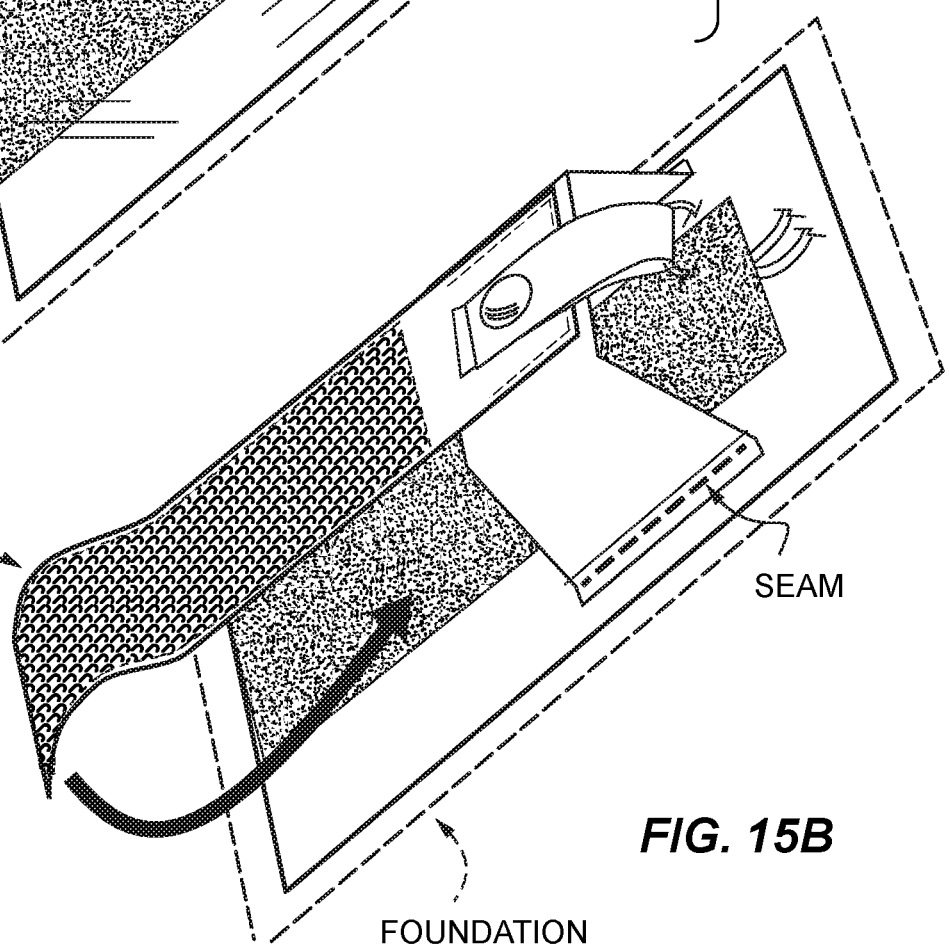

As depicted in FIG. 14 and in FIG. 15B, when the stirrup is looped back (bold arrow) and up into the pocket, the loop contact fastener faces toward the back, and will engage the mating hook contact fastener on the back wall of the pocket. Due to the design of the holster and the use of the reversibly attachable hook and loop contact fastener, the holster is capable of providing customization and secure usability for devices of various heights and types. Some stretch can also be built into the sleeve, although because electronic devices are made to fit the hand, the width dimension of the pocket is quite consistent throughout the industry. In this inventive embodiment, a single holster will fit most radio receivers and other electronic devices, eliminating the need for an expensive OEM holster.

FIGS. 15A and 15B demonstrate schematically the attachment of the sleeve subassembly to a pocket back wall. Stitching fiducials guide assembly. In FIG. 15A the foundation assembly with pocket back wall and hook-type contact fastener is assembled on an oversize substrate layer that can be cut and trimmed to fit the final assembly. In FIG. 15B, the outer sleeve subassembly is sewn onto the pocket back wall. The stitches generally will not go all the way through the back foundation layer. Note that the elastic cord is already anchored under the contact fastener patch. The finished holster is taking shape.

Figure 16:
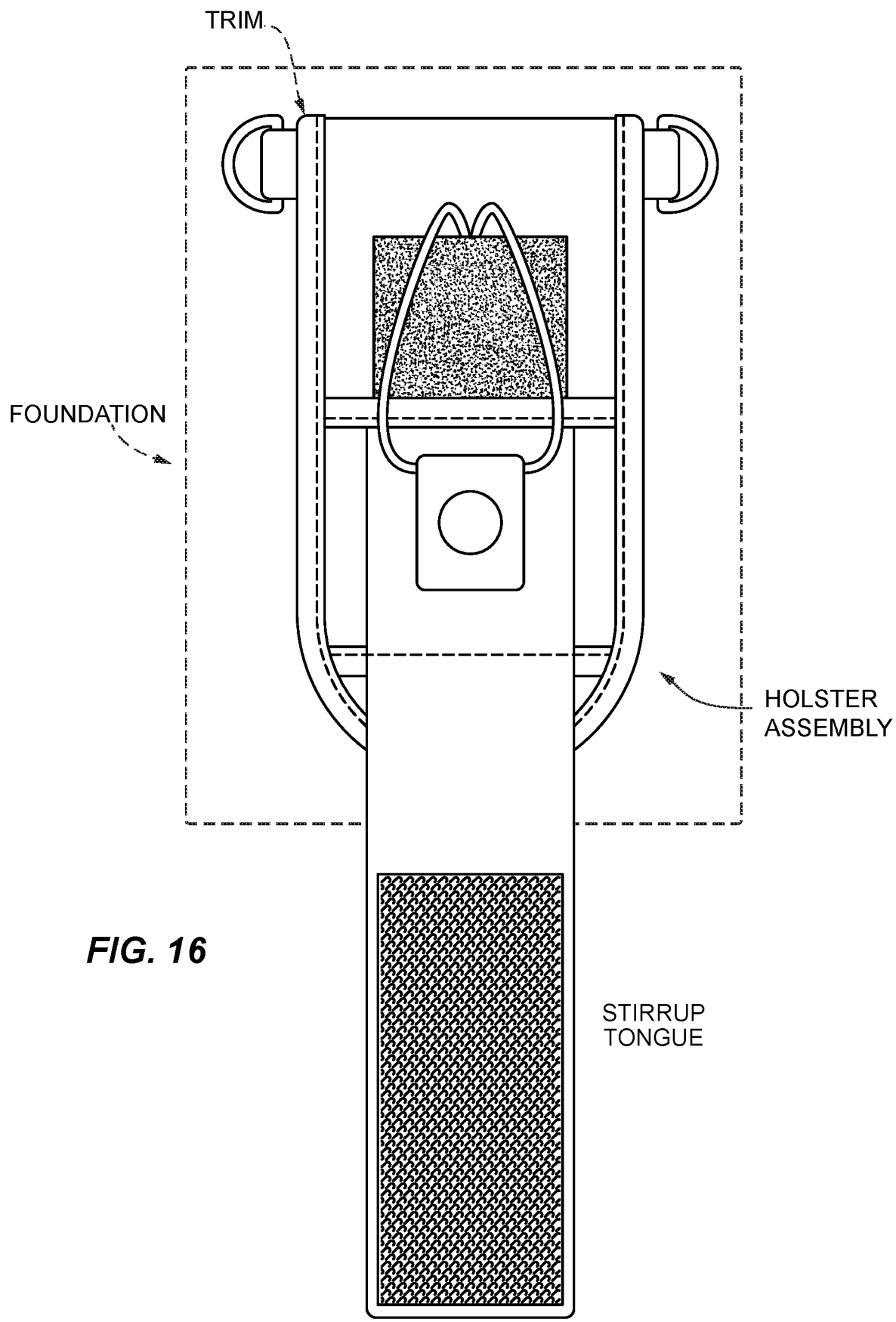
FIG. 16 shows a completed manufacturing intermediate with a foundation around the holster for integration as a "module" into more complex products.

FIG. 16 is a view of a holster as a manufacturing intermediate with an oversized backing layer, termed here a foundation, that is cut to fit and sewn in place according to the nature of the end product. The holster unit or module is mounted with excess foundational substrate that can be cut to shape and integrated into larger combinations. The foundational backing layer also conceals the stitching through the back wall of the pocket. When stocked as a holster subassembly, the foundation assembly and back wall of the pocket may be a double layer that is untrimmed until incorporated into the product combination. Excess material is cut off so that the final assembly is seamless except for the trim. Optionally, the foundation may include a polyurethane layer for stiffness or for water resistance. PHOSITA will recognize however, that a flexible holster will be compliant and form itself as a self-fitting pocket, snug and secure, and the softer fabric material will not cause wear on the housing of the electronic device.

The design of this holster is versatile and may be manufactured as a stand-alone belt holster with D-rings as shown in FIG. 16. But the system is robust, and may also be incorporated into both existing and/or new product lines to serve designated target markets for any portable electronic device having a generally rectangular cuboidal shape. The invention may be adapted to other electronic devices, such as a notebook computer, tablet, small laptop, cellphone, sat phone, voltmeter, rangefinder, inventory scanner, and so forth.

In another option, the holster may be provided with a fabric hinge along the upper margin so as to pivot on the foundational backing layer, as may be useful for example to see the display when standing, or to access a particular control.

In another aspect, the invention is a holster with an adjustable depth compartment or pocket, which encompasses two manufacturing methods to integrate the pocket into existing and/or new products.

The first method of integration would be a "patch style integration" which contains a back wall patch that allows for both side walls and the Velcro strip of the Closed Looped Securing System to be aligned and sewn together. The back wall patch would have enough excess material on the outer margins to allow the back wall patch to be sewn onto any existing/new product in need of a holster.

The second method of integration would be "separate component integration" where the adjustable depth compartment is broken down into separate components and assembled into the complete construction of the existing/new product which would integrate a holster with an adjustable depth compartment to meet the consumer needs for a more versatility and cost reductions associated with the carrying of two-way radios.

Items expected to benefit from this integration of a holster with an adjustable depth compartment include, but are not limited to, chest packs, backpacks, shoulder holsters, tool pouches, utility bags, work belts, camera bags, fanny packs, duffle bags, jackets, vests, and luggage. Many items an OEM/consumer requires include a holster with an adjustable depth compartment. A preferred embodiment includes the use of holsters configured for carrying radios. Advantageously, the holster and any harness need not be replaced when the client adopts new radios that have a different size. The versatile holster is integrated into a shoulder harness, a wearable strap, a vest, or is provided with contralateral D-rings for attachment to a belt.

Figure 17:
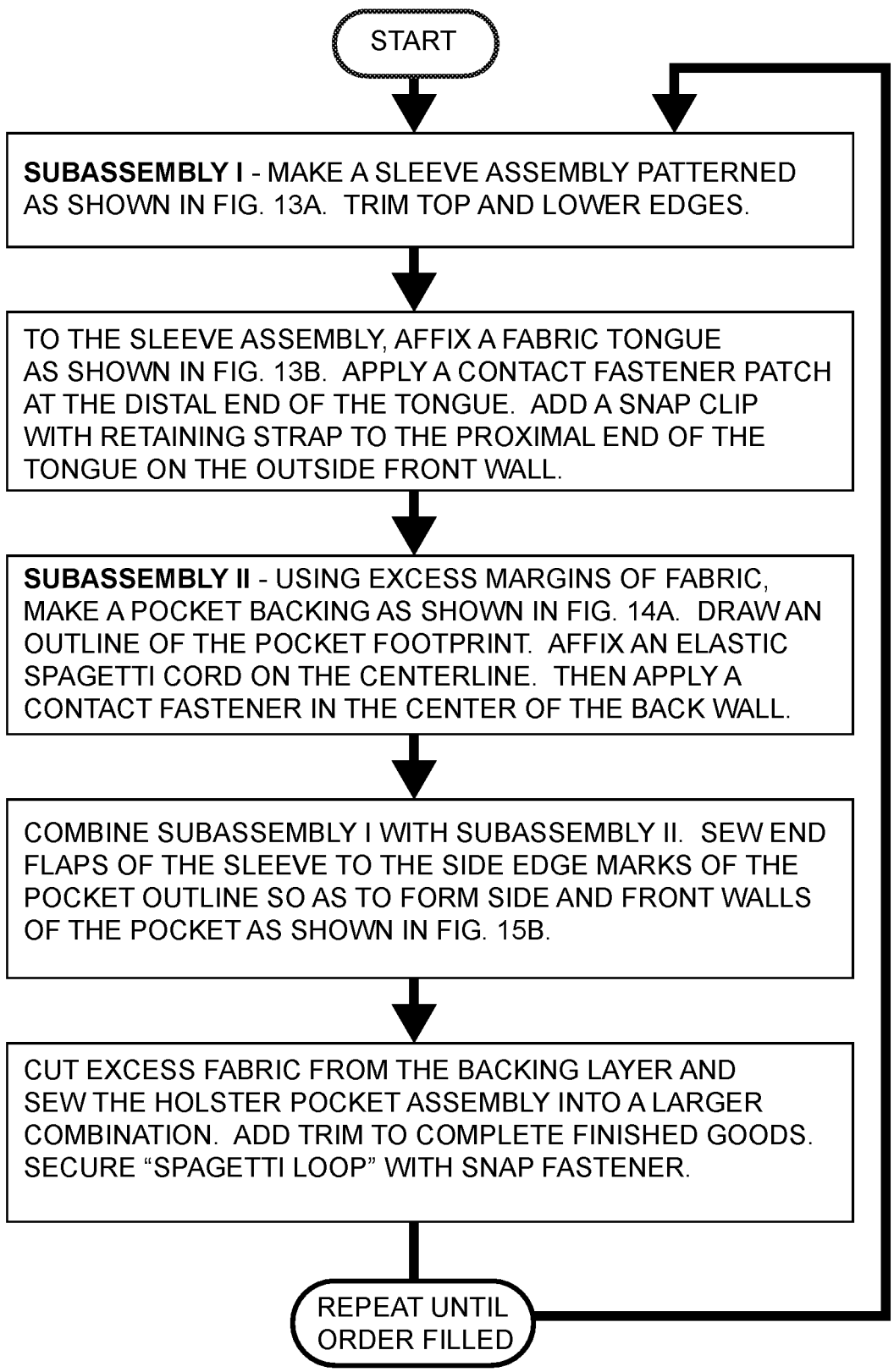
FIG. 17 describes steps of a method for constructing a holster as a manufacturing intermediate or "patch" that is used in making end products combining larger ensembles.

FIG. 17 describes the steps of a method for making the holster assembly as illustrated in FIGS. 12A through 15B. Two subassemblies are made separately and combined to pre-form a "patch style" subunit that can be inventoried and used in larger integrations. This subassembly is stocked and used in making more complex end products having multiple bindings and optional harness, pouch or belt components.

Figure 18:
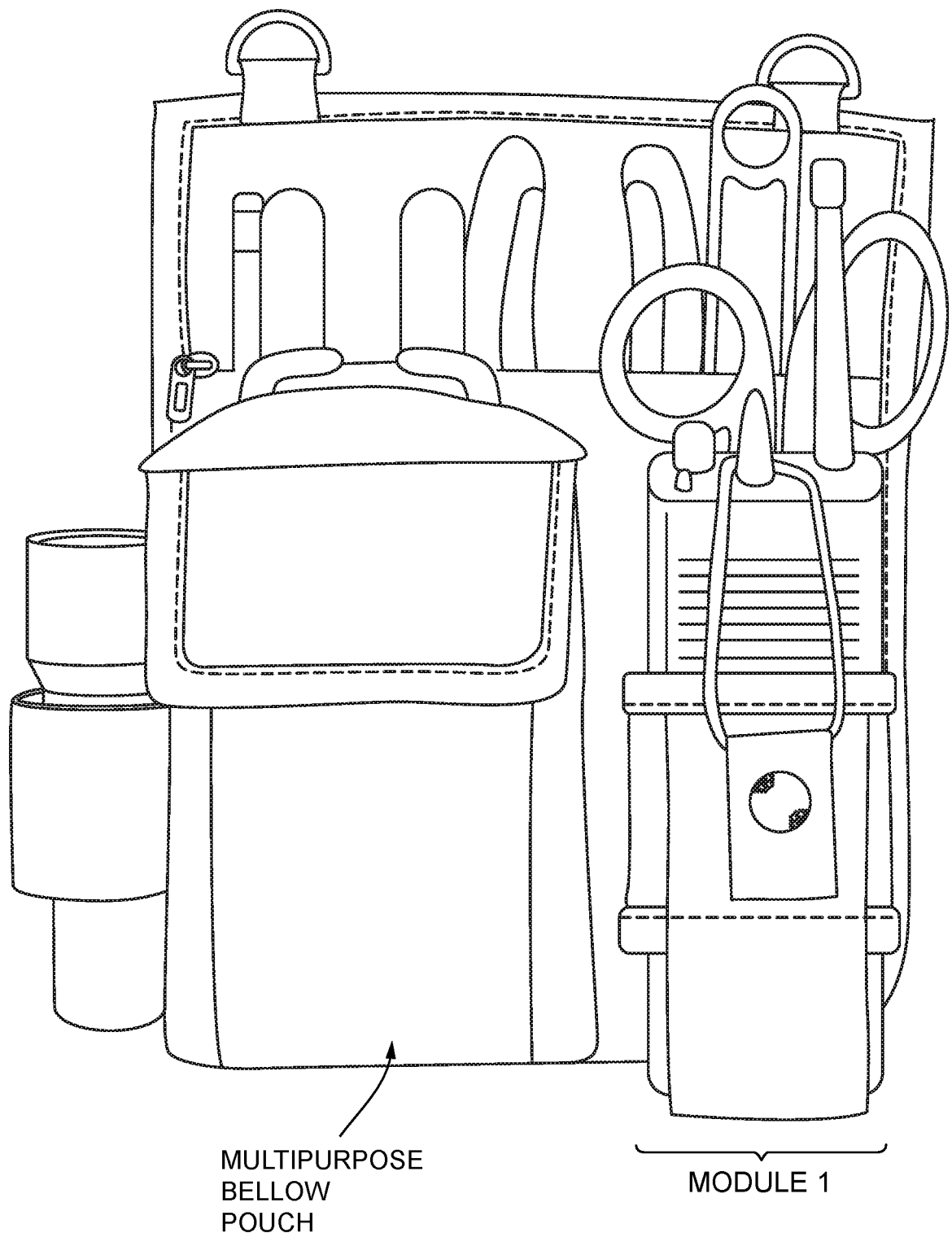
FIG. 18 illustrates a carrying pouch with integrated holster subassembly.

FIG. 18 illustrates a tool pouch with complex integrated features. The pouch has a side-mounted radio holster (module 1). A second "multipurpose pouch" is formed using similar modular process and is sewn into the final product to the left of the radio holster. The multipurpose pouch may be a bellow pouch for example, and may be crafted from nylon or polyester webbing for resistance to nails or screws, for example. In this way, flexibility is achieved with a modular approach that cuts down time from order to delivery, as needed by the market.

Figure 19:
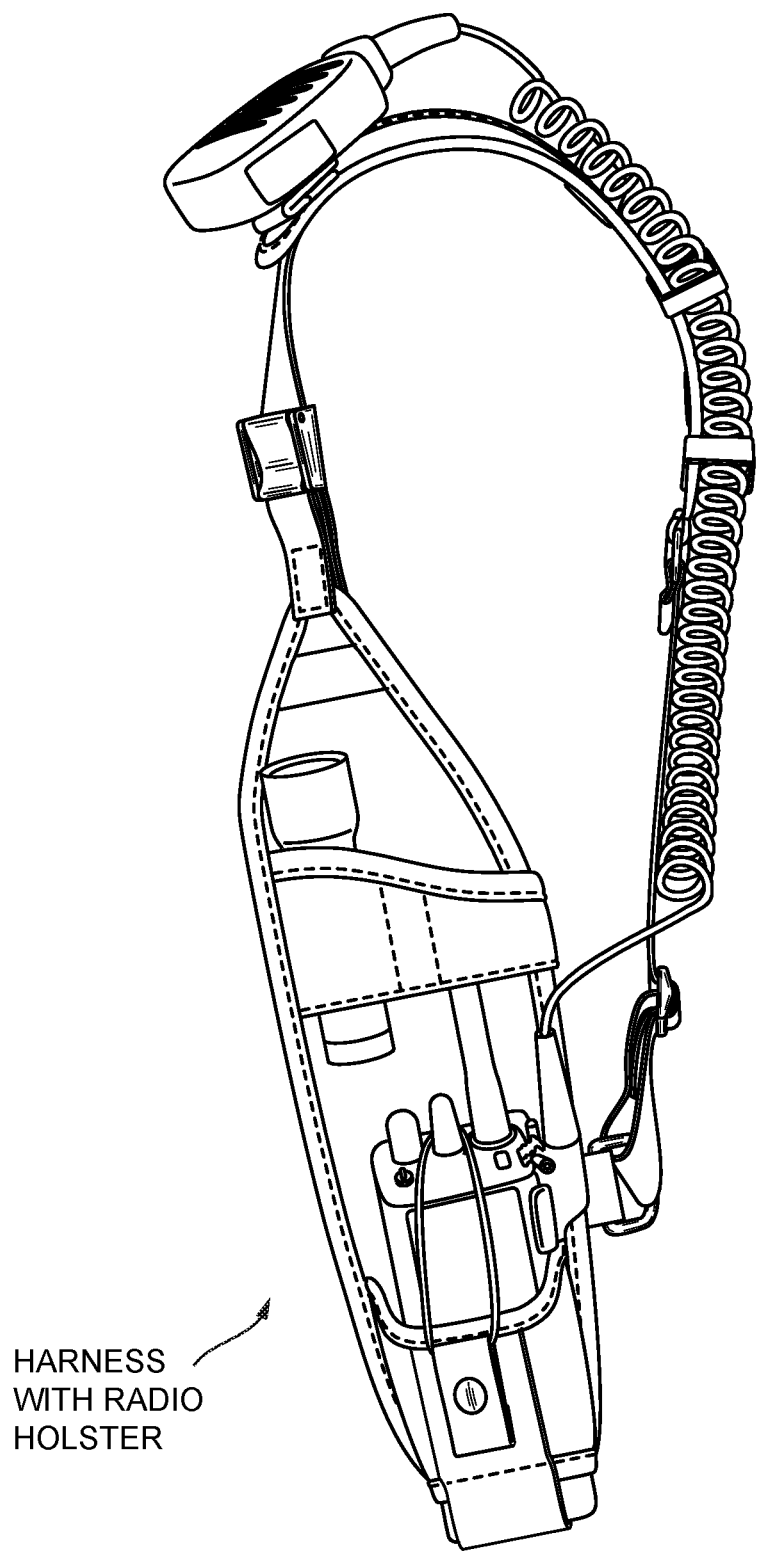
FIG. 19 is a view of shoulder harness with radio holster combination.

FIG. 19 is a view of an integration of a holster subassembly into a shoulder harness combination. Shown is a wearable harness with shoulder strap and partial vest that includes multiple tool straps and pockets. Also integrated is a radio holster at the lower center, the holster having an adjustable pocket and angulated side lips as earlier described. The harness includes adjustable fasteners mounted on the shoulder strap to permit individual fitting so that the user can work comfortably while wearing the harness and yet have easy access to the communications device in the holster. Examples of applications for this construction include shoulder holsters, jackets, vests, or more generally any accessory in need of a holster for carrying an electronic device in a readily accessible pocket, for example.

Figure 20A:
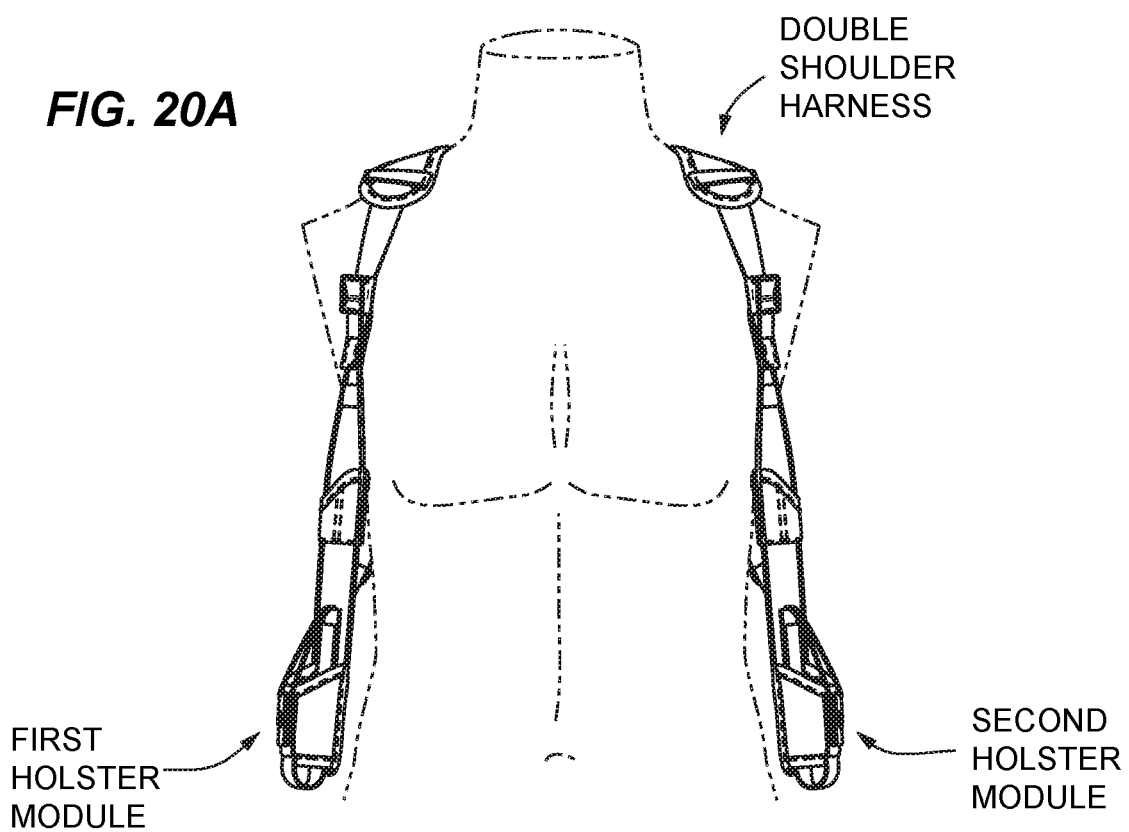
FIGS. 20A and 20B are front and rear views of a double shoulder harness with scapular cross-straps as another example of an integration of the holster subassembly into a larger ensemble.
Figure 20B:
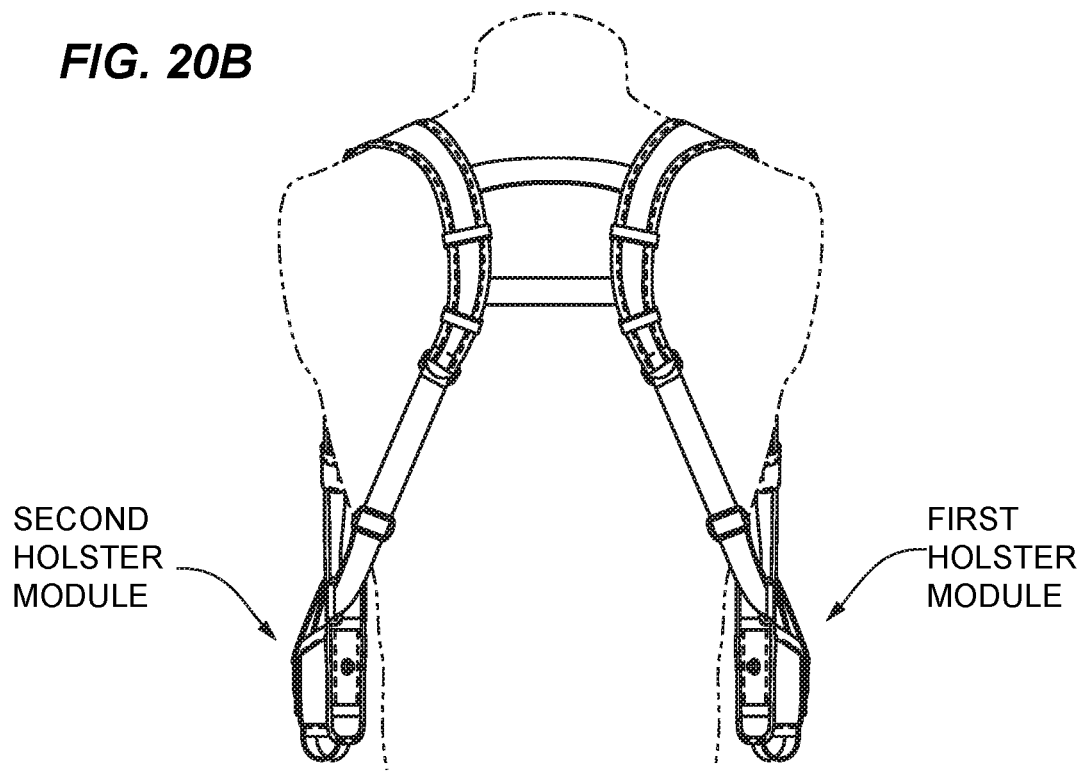

FIGS. 20A and 20B are front and rear views of a double shoulder harness having two holsters and scapular cross-straps as another example of an integration of the holster assembly or module into a larger ensemble.

Figure 21:
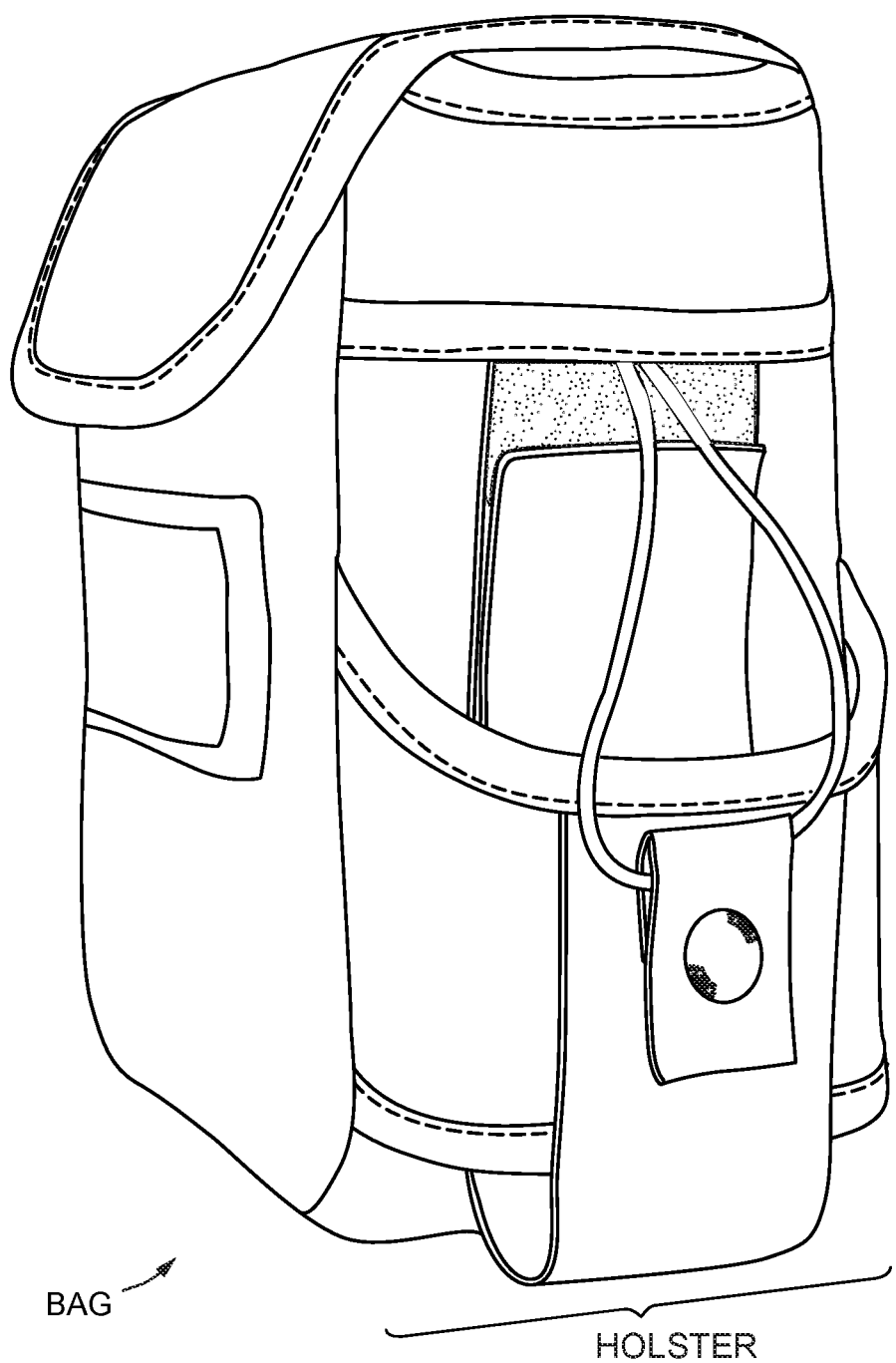
FIG. 21 is a rendering of a tool or camera pouch, for example. The pouch has an end mounted holster that is made to the width of the pouch by sewing in place the foundation from FIG. 16 and components of the holster assembly.

FIG. 21 is a rendering of a tool or camera bag, for example. The bag has an end mounted holster that is made to the width of the bag. The holster of FIG. 21 is made by separate component integration that involves cutting the back pocket wall to the width of the bag and by sewing in place the separate components of the holster sleeve and fasteners so that the width of the pouch matches the width of the bag. Examples of applications for this construction include camera cases, utility bags, work belts, briefcases, luggage or more generally any accessory in need of a holster with an adjustable depth compartment and a customized width for carrying a portable electronic device in a readily accessible pocket, for example. VELCRO® may again be used as a quick release to hold the flap on top of the bag over its contents. In this way holsters of "custom" holster widths are readily produced in bags having multiple uses. A handle assembly or wheels with an extensible handle may also be incorporated. PHOSITA will also recognize that analogous construction can be used to integrate the holster into a backpack. In some variants, the holster backing is attached only at the top edge, for example, so that the holster is essentially hinged, and can be brought to a horizontal position to easily read a display on the electronic device or access a touch screen without dismounting the device from the holster.

Safe Harbor

This specification is provided in connection with U.S. Prov. Patent Appl. Ser. No. 62/461,713, that includes informal sketches and copies of photographs showing exemplary embodiments of the holster invention that articulate and teach, in words, photos and line drawings, those features, options and uses disclosed by the sketches and photographs therein in connection with subsequent conversion of this provisional filing to a formal utility application under 37 CFR § 1.53 and 35 USC § 111(a) (or an international application); the formal application or applications having priority to this application as described under 35 USC § 119(a-e) and/or 35 USC § 365.

INCORPORATION BY REFERENCE

All of the U.S. patents, U.S. patent application publications, U.S. patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

This invention is not limited in its application to any details of construction and the arrangement of components set forth in the above description or illustrated in the drawings.

What is claimed is:

1. A holster with adjustable depth pocket for an electronic device, which comprises:
   a) a stitchwork body defining a holster pocket, the holster pocket having a rear panel that defines a rear wall of the pocket and a front panel that defines:
      (i) a front wall and side walls of the pocket,
      (ii) a front upper edge, the front upper edge defining a front upper lip of the pocket,
      (iii) a bottom lower edge, the bottom lower edge defining a front bottom edge of the pocket;
   b) the front panel having side ends, an inside front pocket face and an outside front pocket face;
   c) the rear panel having side edges and lower edge bordered by rear panel edge trim tape, the rear wall having an inside back pocket face;
   d) wherein the front panel is joined on each side end to the rear panel at an acute inside angle where each side end inserts under the rear panel edge trim tape, the front upper lip and the front bottom edge are bordered by trim tape that inserts under the rear panel edge trim tape, the acute inside angle tapers the pocket from the rear wall to the front wall and defines a trapezoidal pocket section, the front upper lip of the side ends of the front panel having a descendant angle ($\theta_1$) at each side wall, the descendant angle in combination with the acute inside angle defining a guide slot in the front upper lip, the guide slot for guiding a parallelepiped electronic device body in need of a holster into the pocket; and,
   e) wherein a stirrup webbing defines a bottom of the pocket, the bottom having an adjustable depth, the stirrup webbing comprising a tongue that depends from an outside front face of the front wall of the pocket, the tongue having a distal free end, further wherein the free end comprises an opposable surface having a contact fastener configured to reversibly attach to a mating contact fastener on the inside back pocket face of the rear wall of the pocket when the tongue is looped under the pocket, is inserted by the free end into the pocket from the bottom thereof, and overlappedly contacted and fastened against the mating contact fastener at an adjustable position.

2. The holster of claim 1, further comprising a loop of elastic cordage that defines a top restraint element of the pocket, the loop having a fixed attachment on the rear wall, the loop having a free end configured to engage a top of a parallelepiped device body in need of a holster and to be stretchedly affixed to the outside front face of the pocket.

3. The holster of claim 2, wherein said holster comprises a six-element restraint system and has two separate tensioning adjustments.

4. The holster of claim 3, wherein said stirrup webbing defines an airflow port and cleanout port on either side of said tongue at said bottom of said pocket.

5. The holster of claim 2, comprising a snap clip, clasp or rivet for securing said loop of elastic cordage to said front wall of said pocket.

6. The holster of claim 1, further comprising a substrate layer disposed as a covering on an outside surface of said back wall.

7. The holster of claim 6, wherein said holster is provided with a system of D-rings, a harness attachment, or a belt attachment so as to be worn.

8. The holster of claim 6, wherein said substrate layer comprises a fabric hinge on a top margin thereof and is pivotably attachable to a belt, vest or harness.

9. The holster of claim 1, wherein said holster is compatible for carrying a portable electronic device selected from two-way radio, cellular telephone, satellite phone, camera, PDA, notebook computer, smart device, compact laptop, voltmeter, multimeter, barcode reader, label maker, inventory scanner, or meter reader.

10. The holster of claim 1, wherein said holster is configured to receive, carry and operate a radio therein.

11. The holster of claim 10, said tongue having a permanent attachment at a front face of said pocket and an adjustable overlap and contact attachment on a back inside surface of said pocket, such that said pocket adjustably accepts radios of various sizes and lengths; and further wherein said stirrup, when engaged underneath a radio, is enabled to draw said pocket tightly around a radio disposed therein.

12. The holster of claim 1, wherein said front panel comprises a felt inside pocket liner.

13. The holster of claim 1, wherein said contact fastener is a hook-and-loop contact fastener interface, and further wherein the contact fastener interface is configured to be compressed and unslippable when a parallelipiped electronic device body in need of a holster is inserted in the pocket.

14. The holster of claim 13, wherein said adjustable depth pocket with front wall, back wall, side walls, elastic loop member, and stirrup webbing defines a six-element closed loop restraint system enabled to carry therein and operate therein a radio of parallelepiped device body geometry with six faces, each face contacted with an element of said six-element restraint system.

15. The holster of claim 10, wherein said slope $\theta_1$ is enabled to guide a radio of parallelepiped device body geometry into said pocket and to provide access to controls and ports while wearing the holster.

16. The holster of claim 10, further comprising a substrate layer disposed as a covering on an outside surface of said back wall.

17. The holster of claim 16, wherein said substrate layer comprises a fabric hinge on a top margin thereof and is pivotably attachable to a belt, vest or harness.

18. The holster of claim 16, wherein said holster is integrated into a shoulder harness, a wearable strap, a vest, or is provided with contralateral D-rings for attachment to a belt.

* * * * *